United States Patent
Garwood

(10) Patent No.: US 8,012,521 B2
(45) Date of Patent: Sep. 6, 2011

(54) METHOD FOR CONTROLLING WATER CONTENT WITH DECONTAMINATION IN MEATS

(75) Inventor: Anthony J. M. Garwood, Mercer Island, WA (US)

(73) Assignee: SafeFresh Technologies, LLC, Mercer Island, WA (US)

( * ) Notice: Subject to any disclaimer, the term of this patent is extended or adjusted under 35 U.S.C. 154(b) by 417 days.

(21) Appl. No.: 11/589,320

(22) Filed: Oct. 26, 2006

(65) Prior Publication Data

US 2007/0254074 A1     Nov. 1, 2007

Related U.S. Application Data

(60) Continuation of application No. 10/385,217, filed on Mar. 7, 2003, now abandoned, which is a division of application No. PCT/US01/45146, filed on Nov. 28, 2001.

(60) Provisional application No. 60/255,684, filed on Dec. 13, 2000, provisional application No. 60/286,688, filed on Apr. 26, 2001, provisional application No. 60/291,872, filed on May 17, 2001, provisional application No. 60/299,240, filed on Jun. 18, 2001, provisional application No. 60/312,176, filed on Aug. 13, 2001, provisional application No. 60/314,109, filed on Aug. 21, 2001, provisional application No. 60/323,629, filed on Sep. 19, 2001, provisional application No. 60/335,760, filed on Oct. 19, 2001.

(51) Int. Cl.
G01N 31/12 (2006.01)

(52) U.S. Cl. ........ 426/232; 426/316; 426/320; 426/326; 426/332; 426/392; 426/506; 426/524

(58) Field of Classification Search .......... 426/231–233, 426/312, 316, 320, 324, 326, 332, 335, 641–647, 426/392, 506, 518, 524
See application file for complete search history.

(56) References Cited

U.S. PATENT DOCUMENTS

| | | | | |
|---|---|---|---|---|
| 2,065,358 A | * | 12/1936 | Zarotschenzeff | 62/91 |
| 2,080,179 A | * | 5/1937 | Merriam et al. | 422/27 |
| 2,596,514 A | | 5/1952 | Uehlein | |
| 2,824,011 A | * | 2/1958 | Williams | 426/642 |
| 2,836,825 A | * | 5/1958 | Schnell | 426/518 |
| 2,860,056 A | * | 11/1958 | Purdy | 426/506 |
| 2,964,412 A | * | 12/1960 | Morrison | 426/506 |
| 3,003,768 A | * | 10/1961 | Clements | 473/327 |
| 3,006,768 A | | 10/1961 | Williams | |
| 3,011,898 A | | 12/1961 | Anderson | |
| 3,050,399 A | * | 8/1962 | Kielsmeier et al. | 426/231 |

(Continued)

OTHER PUBLICATIONS

Food Microbiology 4th Edition, William Frazier and Dennis Westhoff, McGraw-Hill Inc., 1988, p. 153-156.*

(Continued)

*Primary Examiner* — Drew E Becker
(74) *Attorney, Agent, or Firm* — Christensen O'Connor; Johnson Kindness PLLC

(57) ABSTRACT

Disclosed is a method for producing treated meat having a predetermined proportion of water in a container. The method includes treating meat that has lost water content through evaporation with an agent capable of killing bacteria together with an amount of water, wherein the amount of water corresponds to the amount of water that is lost through evaporation. The method provides meat being treated with a bactericidal agent as well as also providing meat with the predetermined amount of water for packaging.

19 Claims, 7 Drawing Sheets

U.S. PATENT DOCUMENTS

| | | | |
|---|---|---|---|
| 3,067,015 A | 12/1962 | Lawdermilt | |
| 3,088,290 A * | 5/1963 | Zearfoss, Jr. | 62/78 |
| 3,125,450 A * | 3/1964 | Williams | 426/281 |
| 3,304,733 A * | 2/1967 | Coffman | 62/100 |
| 3,348,954 A * | 10/1967 | Green | 426/613 |
| 3,366,309 A | 1/1968 | Scharre | |
| 3,393,077 A * | 7/1968 | Moreau | 426/410 |
| 3,396,430 A | 8/1968 | Westcott | |
| 3,442,660 A * | 5/1969 | Shank | 426/312 |
| 3,481,100 A | 12/1969 | Bergstrom | |
| 3,851,080 A | 11/1974 | Lugg | |
| 3,857,988 A | 12/1974 | Jensen | |
| 3,890,825 A * | 6/1975 | Davis | 374/14 |
| 3,930,040 A | 12/1975 | Woodruff | |
| 4,003,728 A * | 1/1977 | Rath | 62/78 |
| 4,062,981 A | 12/1977 | Bridgeford | |
| 4,114,348 A | 9/1978 | Mahaffy | |
| 4,171,164 A | 10/1979 | Groves | |
| 4,199,958 A | 4/1980 | Masuda | |
| 4,201,030 A | 5/1980 | Mahaffy | |
| 4,244,978 A | 1/1981 | Barta | |
| 4,314,451 A | 2/1982 | Leeds | |
| 4,363,263 A | 12/1982 | Williams | |
| 4,388,811 A * | 6/1983 | Zebarth | 62/63 |
| 4,419,205 A * | 12/1983 | Rose | 204/229.4 |
| 4,476,686 A | 10/1984 | Madsen | |
| 4,552,600 A | 11/1985 | Laiewski | |
| 4,569,204 A | 2/1986 | Ott | |
| 4,576,278 A | 3/1986 | Laiewski | |
| 4,594,253 A | 6/1986 | Fradin | |
| 4,642,239 A | 2/1987 | Ferrar | |
| 4,685,274 A | 8/1987 | Garwood | |
| 4,714,618 A | 12/1987 | Matsuda | |
| 4,744,199 A | 5/1988 | Gannon | |
| 4,798,324 A | 1/1989 | Gannon | |
| 4,810,515 A * | 3/1989 | Bourdel | 426/524 |
| 4,818,548 A | 4/1989 | Cheng | |
| 4,840,271 A | 6/1989 | Garwood | |
| RE33,067 E | 9/1989 | Corrigan | |
| 4,987,725 A | 1/1991 | Gill | |
| 4,992,287 A | 2/1991 | Dreano | |
| 5,025,611 A | 6/1991 | Garwood | |
| 5,034,235 A | 7/1991 | Dunn | |
| 5,042,540 A | 8/1991 | Gorlich | |
| 5,053,237 A * | 10/1991 | Hendricks et al. | 426/281 |
| 5,103,618 A | 4/1992 | Garwood | |
| 5,115,624 A | 5/1992 | Garwood | |
| 5,129,512 A | 7/1992 | Garwood | |
| 5,155,974 A | 10/1992 | Garwood | |
| 5,226,531 A | 7/1993 | Garwood | |
| 5,247,460 A * | 9/1993 | LaBudde | 702/81 |
| 5,306,466 A | 4/1994 | Goldsmith | |
| 5,323,590 A | 6/1994 | Garwood | |
| 5,334,405 A | 8/1994 | Gorlich | |
| 5,348,752 A | 9/1994 | Gorlich | |
| 5,352,467 A | 10/1994 | Mitchell | |
| 5,393,547 A * | 2/1995 | Balaban et al. | 426/330 |
| 5,419,101 A | 5/1995 | Gorlich | |
| 5,433,142 A | 7/1995 | Roth | |
| 5,447,736 A | 9/1995 | Gorlich | |
| 5,458,901 A | 10/1995 | Engler | |
| 5,460,833 A | 10/1995 | Andrews | |
| 5,478,990 A | 12/1995 | Montanari | |
| 5,479,759 A | 1/1996 | Gorlich | |
| 5,481,852 A | 1/1996 | Mitchell | |
| 5,484,615 A | 1/1996 | Kounev | |
| 5,514,392 A | 5/1996 | Garwood | |
| 5,520,005 A | 5/1996 | Appolonia | |
| 5,534,282 A | 7/1996 | Garwood | |
| 5,547,694 A | 8/1996 | Perry | |
| 5,560,182 A | 10/1996 | Garwood | |
| 5,590,602 A | 1/1997 | Peck | |
| 5,591,496 A | 1/1997 | Anderson | |
| 5,597,561 A | 1/1997 | Kross | |
| 5,597,597 A | 1/1997 | Newman | |
| 5,597,599 A | 1/1997 | Smith | |
| 5,622,725 A | 4/1997 | Kross | |
| 5,628,959 A | 5/1997 | Kross | |
| 5,629,060 A | 5/1997 | Garwood | |
| 5,651,977 A | 7/1997 | Kross | |
| 5,655,708 A | 8/1997 | Gröne | |
| 5,667,817 A | 9/1997 | Kross | |
| 5,667,827 A | 9/1997 | Breen | |
| 5,668,634 A | 9/1997 | Newman | |
| 5,676,736 A | 10/1997 | Crozel | |
| 5,686,126 A | 11/1997 | Noel | |
| 5,693,354 A | 12/1997 | Spencer | |
| 5,698,250 A | 12/1997 | DelDuca | |
| 5,709,897 A | 1/1998 | Pearlstein | |
| 5,720,915 A | 2/1998 | Joppen | |
| 5,730,311 A | 3/1998 | Curtis | |
| 5,731,023 A * | 3/1998 | Milani | 426/410 |
| 5,772,985 A | 6/1998 | Kemp | |
| 5,779,832 A | 7/1998 | Kocher | |
| 5,816,488 A | 10/1998 | Moeder | |
| 5,823,867 A | 10/1998 | Roth | |
| 5,833,894 A | 11/1998 | Lanzani | |
| RE36,064 E | 1/1999 | Davidson | |
| 5,865,293 A | 2/1999 | Napadow | |
| 5,871,795 A | 2/1999 | Roth | |
| 5,879,732 A * | 3/1999 | Caracciolo et al. | 426/231 |
| 5,882,916 A | 3/1999 | Wiersma | |
| 5,885,637 A | 3/1999 | Roth | |
| 5,885,640 A | 3/1999 | Andersson | |
| 5,944,749 A | 8/1999 | Fenn | |
| 5,948,457 A | 9/1999 | DelDuca | |
| 5,950,402 A | 9/1999 | Hoddinott | |
| 5,994,706 A | 11/1999 | Allen | |
| 5,996,155 A | 12/1999 | Chao | |
| 6,010,727 A | 1/2000 | Rosenthal | |
| 6,036,918 A | 3/2000 | Kowanko | |
| 6,039,991 A | 3/2000 | Ruozi | |
| 6,042,859 A | 3/2000 | Shaklai | |
| 6,046,243 A | 4/2000 | Wellinghoff | |
| 6,054,161 A | 4/2000 | Palmer | |
| 6,054,164 A | 4/2000 | Roth | |
| 6,063,425 A | 5/2000 | Kross | |
| 6,066,348 A | 5/2000 | Yuan | |
| 6,085,930 A | 7/2000 | Curtis | |
| 6,086,833 A | 7/2000 | Conners | |
| 6,096,350 A | 8/2000 | Kemp | |
| 6,120,731 A | 9/2000 | Kross | |
| 6,123,966 A | 9/2000 | Kross | |
| 6,142,067 A | 11/2000 | Roth | |
| 6,148,249 A | 11/2000 | Newman | |
| 6,162,477 A | 12/2000 | Crisinel | |
| 6,167,709 B1 | 1/2001 | Caracciolo, Jr. | |
| 6,180,585 B1 | 1/2001 | Schalitz | |
| 6,183,807 B1 | 2/2001 | Gutzmann | |
| 6,194,012 B1 | 2/2001 | Palmer | |
| 6,200,618 B1 | 3/2001 | Smith | |
| 6,210,730 B1 | 4/2001 | Mitchell | |
| 6,265,006 B1 | 7/2001 | Inglis | |
| 6,285,030 B1 | 9/2001 | Williams | |
| 6,294,791 B1 | 9/2001 | Williams | |
| 6,328,909 B1 | 12/2001 | Kross | |
| 6,331,272 B1 | 12/2001 | Sims | |
| 6,342,261 B1 | 1/2002 | Spencer | |
| 6,349,526 B1 | 2/2002 | Newman | |
| 6,355,287 B2 * | 3/2002 | Noel et al. | 426/127 |
| 6,379,728 B1 | 4/2002 | Roth | |
| 6,387,426 B1 | 5/2002 | Roth | |
| 6,389,838 B1 | 5/2002 | Roth | |
| 6,406,728 B1 | 6/2002 | Roth | |
| 6,430,467 B1 | 8/2002 | D'Amelio | |
| 6,434,950 B2 | 8/2002 | Newman | |
| 6,481,220 B2 | 11/2002 | Butler | |
| 6,551,182 B2 | 4/2003 | Caracciolo, Jr. | |
| 6,730,341 B2 | 5/2004 | Ludwig | |
| 2001/0042841 A1 | 11/2001 | Lyons | |
| 2002/0001648 A1 | 1/2002 | Roth | |
| 2002/0015777 A1 | 2/2002 | Roth | |
| 2002/0017203 A1 | 2/2002 | Roth | |
| 2002/0043050 A1 | 4/2002 | Costello | |
| 2002/0075754 A1 | 6/2002 | Huber | |
| 2002/0075755 A1 | 6/2002 | Huber | |
| 2002/0110624 A1 | 8/2002 | Roth | |

| | | |
|---|---|---|
| 2002/0150659 A1 | 10/2002 | Roth |
| 2002/0162971 A1 | 11/2002 | Koenck |
| 2003/0017252 A1 | 1/2003 | Roth |

OTHER PUBLICATIONS

Dillow, A.K., et al., "Bacterial Inactivation by Using Near- and Supercritical Carbon Dioxide," Proc. Natl. Acad. Sci. 96(18):10344-10348, Aug. 31, 1999.

Martin, J.D., et al., "Effects of Carbon Dioxide on Bacterial Growth Parameters in Milk as Measured by Conductivity," J. Dairy Sci. 86(6):1932-1940, Jun. 2003.

Spilimbergo, S., and A. Bertucco, "Non-Thermal Bacteria Inactivation With Dense CO2," Biotechnology and Bioengineering 84(6):627-638, Dec. 20, 2003.

* cited by examiner

METHOD FOR CONTROLLING WATER CONTENT WITH DECONTAMINATION IN MEATS

CROSS-REFERENCES TO RELATED APPLICATIONS

This application is a continuation of application Ser. No. 10/385,217, filed Mar. 7, 2003, which is a divisional of Application No. PCT/US01/45146, filed Nov. 28, 2001. Application No. PCT/US01/45146, filed Nov. 28, 2001, claims the benefit of Provisional Application Nos. 60/255,684, filed Dec. 13, 2000; 60/286,688, filed Apr. 26, 2001; 60/291,872, filed May 17, 2001; 60/299,240, filed Jun. 18, 2001; 60/312,176, filed Aug. 13, 2001; 60/314,109, filed Aug. 21, 2001; 60/323,629, filed Sep. 19, 2001; and 60/335,760, filed Oct. 19, 2001.

BACKGROUND

A problem in the meat packing industry is the formation of metmyoglobin and growth of aerobic bacteria on finished packages of meat, reducing the shelf life of meat and ending in vast amounts of waste. Metmyoglobin is an oxygenated form of myoglobin, a protein in meat. The problem arises when the meat, in either ground or sliced form, is exposed to air for too long. Deoxymyoglobin is a precursor protein which when oxygenated forms oxymyoglobin in a normal atmosphere of oxygen. Oxymyoglobin is responsible for the bright red color of meat which is desirable. When oxymyoglobin is immersed in a substantially oxygen deficient atmosphere, the process reverses itself and the oxymyoglobin will reduce, yielding oxygen in gas form or dissolved in the surface water of the meat. If the free gas space in the package is very small, such as a chubb package, or even a vacuum package, the relative percentage volume of oxygen can become very high. This can lead to metmyoglobin formation, discoloration and growth of aerobic bacteria in the areas of high oxygen concentration. volume of oxygen can become very high. This can lead to metmyoglobin formation, discoloration and growth of aerobic bacteria in the areas of high oxygen concentration.

Previous methods of controlled atmosphere or modified atmosphere packaging have sought to eliminate oxygen in packages, however, not realizing the detrimental effect that oxygen trapped in the form of oxymyoglobin can have, once packaged. Bright red meat, full of oxymyoglobin, packaged in low oxygen will inevitably result in the worst looking meat. Attempts to deal with this included using oversized packages with excess amounts of free space in the package. Further, methods of processing beef are beset with other inefficiencies and problems.

For example, typically all carcasses are chilled prior to further processing, yet the carcasses contain a great deal of bone and other materials that are not used for human consumption and yet the entire carcass is chilled prior to processing. Furthermore, the shape of meat primals made into food items used for human consumption are of irregular and inconvenient profile. Conversely, packaging trays that have been cost effectively and efficiently manufactured, are invariably rectangular and/or square in profile. By adopting procedures disclosed herein, it will be seen that costs of chilling are reduced since, for example, the skeleton can be removed before chilling thereby saving costs of such chilling process. Fresh red meat tissue is typically quite soft and easy to cut immediately after the animal has been slaughtered and prior to the natural, "hardening" effects of rigor mortis has occurred. It can therefore be easier and quicker to cut primal portions from animal carcasses, during the normal animal "disassembly" process prior to rigor mortis and chilling. Those fresh red meat primal items, that are intended for human consumption, can then be shaped by placing into molds of a specifically designed and desired profile prior to rigor mortis and then chilled during the natural rigor mortis process. This device will provide a method to change and adjust the shape of fresh red meat primal items so that, for example, fresh red meat primal items can be readily and automatically processed during the slicing and cutting process as required prior to packaging. Furthermore, profiles of primal meat portions can be fixed so as to be more convenient when slices of fresh red meat primal items are loaded into improved packaging, such that packaging volume can be efficiently utilized, while still maintaining a space efficient, appealing and attractive appearance for the consumer at the point of retail display and/or food service outlet.

Typical modified atmosphere packages for fresh foods, such as red meats and other perishable foods, have a limited shelf life, and typically include a thermoformed tray or other package composed of EPS/tie/PE (barrier foam trays) plastics material or other suitable substantially gas impermeable material, i.e., tray, overlaid with a single transparent web of plastics material that can be heat sealed to the tray. A typical substantially gas impermeable heat sealable composite web includes a biaxially oriented polyester (PET) layer/tie layer/gas barrier layer (such as PVDC) an adhesive layer/heat sealing layer (such as polyethylene), which in turn is finally adhered by a heat sealer to the tray. The polyethylene layer is a heat sealable layer that is tied to a gas barrier layer such as polyvinylidene chloride which is in turn adhered to polyester. Because of the diverse types of materials that are employed in the foregoing package, it is difficult to reprocess and recycle the post-consumer package. Moreover, the cost associated with post-consumer recycling of multiple layer plastics material renders the process impractical and substantially not economically feasible.

Commonly used modified atmosphere packages for fresh foods such as red meats and other perishable foods having a limited shelf life typically comprise a tray thermoformed from a sheet of EPS (expanded polystyrene) laminated to a web of substantially gas impermeable web material or other suitable substantially gas impermeable material. A lid, such as a single or composite transparent web of plastics material that can be bonded to the flanges of the tray. Both tray and lid materials are typically substantially gas impermeable heat sealable composite structures and cannot be readily recycled. Lid material typically comprises a laminated structure including several layers such as bi-axially oriented polyester bonded to a gas barrier layer (such as PVDC) which is sandwiched between an adhesive or heat sealing layer (such as polyethylene). Because of the diverse types of materials that are employed in the foregoing package, it is difficult to reprocess and recycle the "post-consumer" package. Moreover, the cost associated with post-consumer recycling of multiple layer plastics material, such as the aforementioned, renders the process impractical and substantially not economically feasible.

A further limitation of packaging perishable goods such as fresh red meats in hermetically sealed gas barrier packages results from the need to enclose a relatively large volume of gas, within the package. Clearly, consumers have no interest in purchasing these gasses that accompany the red meat. Minimizing the size and bulky appearance of such packaging is desirable. Additionally, a major proportion of red meat production occurs at locations that are located at a substantial distance from the point of retail sale of red meats to consumers. Most U.S. beef is produced in the central plains around Kansas, Nebraska, and Iowa and the major markets are situated on the coastal regions such as New York or California. Costs of shipping these fresh red meat items from the point of production and packaging can be reduced if the packages are reduced in volume. However, reduction in the volume of gases provided within a package can have a deleterious effect on shelf life of the perishable goods and red meat contained therein as explained above.

The packaging industry has therefore felt the need for simplified individual packaging structures that will provide finished package performance including label requirements for a variety of applications. Additionally, if the packaging can be handled economically both in the pre-consumer handling and in post-consumer recycling, significant economic advantages are available.

With conventional packaging of meats and other perishable type goods, the shelf life is limited due to bacterial growth within the package. The growth can be inhibited when the package contains carbon dioxide gas, however, carbon dioxide will dissolve in liquids such as water contained within the goods in the package. After time, carbon dioxide can become substantially dissolved in the water, limiting the shelf life. When carbon dioxide dissolves into liquids and water, this can cause the package to collapse inwardly. Collapsing causes the appearance of the package to be unacceptable to consumers and can also cause the package to rupture.

In order to extend shelf and storage life of the packaged goods several inventions have been disclosed and examples of known packaging for this purpose are given in the following U.S. patents:

| | | |
|---|---|---|
| 5,779,832 | Kocher | Method and Apparatus for making a peelable film |
| 5,629,060 | Garwood | Packaging with Peelable Lid |
| 5,560,182 | Garwood | Packaging Method |
| 5,534,282 | Garwood | Packing Perishable Goods |
| 5,514,392 | Garwood | Packaging for Perishable Goods |
| 5,323,590 | Garwood | Method of producing food packaging with gas between tensioned film and lid |
| 5,226,531 | Garwood | Food Packaging with gas between tensioned film and Lid |
| 5,155,974 | Garwood | Food Packaging with gas between tensioned film and Lid |
| 5,115,624 | Garwood | Thermoplastic skin packing means |
| 5,129,512 | Garwood | Packaging |

The subject matter of the above patents is hereby incorporated by reference.

Prior art as described in U.S. Pat. No. 5,779,832 to Kocher discloses a method of making a multilayer peelable film. Kocher discloses a method of co-extruding two webs of material simultaneously in the form of a multilayer film that can be delaminated into a third web and a second web and then, after treating the second web to improve gas permeability therethrough, re-laminating the third and second webs together. These two re-laminated webs can be sealed to a first web of gas barrier material and thereby produce a package. The first web may have a depression formed therein into which goods such as red meat can be placed before heat sealing the third and second webs to the first web. Typically, goods will not completely fill the depression and space will remain in the depression in addition to the goods. A blend of gases or a single gas such as $CO_2$ can be provided in the space with the goods and thereby can contact the goods. After storage and prior to retail display at an intended point of sale to consumers, the third web can be peeled from the package allowing atmospheric oxygen to permeate the second web of gas permeable material and to contact the goods. The atmospheric oxygen can then allow generation of a bright red colored substance such as oxymyoglobin thereby providing an appearance attractive to the consumers.

It has been found that when applying the second and third webs extruded in the manner as disclosed in Kocher to packaging as that disclosed in the inventor's own U.S. Pat. No. 5,534,282, a dull appearance of the second web can result with reduced clarity when compared with other webs of material that are produced in a single web such as plasticized PVC (pPVC). Furthermore, after removal of the third web, from the re-laminated co-extrusion, by peeling, as described in U.S. Pat. No. 5,534,282, distortions and ripples can appear in the second web. This occurs, partly, as a result of inadequate lateral tension provided in the second web when limited by the inherent limitations of co-extruding the second and third webs simultaneously. This can, therefore, severely detract from the visual appearance of the package in the eyes of consumers.

Conventional modified atmosphere "case ready" retail packaged fresh red meats and other perishable type goods experience limited shelf life because of bacterial growth, such as aerobic and anaerobic bacteria, on the packaged goods; rancidity "off flavors" caused, in part, by oxidizing fats; and discoloration to visible meat surfaces. The growth can be inhibited when goods are treated by exposure to certain agents prior to packaging and then providing certain gases and/or other agents with the goods within the finished and sealed package. However, some gases such as carbon dioxide gas, for example, can quickly dissolve in substances such as oils and water contained in the goods. After time, carbon dioxide can become substantially dissolved in water which may limit shelf life. Furthermore, when oxygen is present and more particularly when a quantity of approximately 5,000 to 30,000 parts per million of oxygen is present in a gas within a package, discoloration due to formation of metmyoglobin on the visible surface of red meat, reduces consumer appeal of the packaged goods. When carbon dioxide dissolves (into another substance) the combined volume of the residual substances is substantially reduced which can cause the package to collapse inwardly. Collapsing causes the appearance of the package to be unacceptable to consumers and can also cause the package to rupture and render it unfit for use. In compensating for such a deleterious event, several existing packaging systems require large volumes of gas to be packaged with the goods. However, when large volumes of gas are provided, the resultant "bulky" condition does not provide for cost efficient shipping and distribution from the location of packaging to the point of retail sale of the packaged goods.

Conventional packages for red meat are produced in one or more sizes. When packaging red meats or other perishable goods, the package must conform to the goods. Therefore, if a red meat portion is too large for one size of a package, the next larger size must be used. Oftentimes, this will lead to an overly large sized package introducing inefficiency into the process because of the wasted space. In order to maximize efficient use of the internal space available in a typical road, rail or sea, refrigerated shipping container or trailer, it is important to increase the density and unit weight per unit volume of the packaged perishable goods. The maximized efficient use of the space in the shipping containers can be achieved by adjusting the shape of the inconveniently shaped animal fresh red meat primal portions such that slices of the fresh red meat primal portions will fit and substantially fill the available space within trays of the improved packaging.

High oxygen case ready packages are inefficient, in large part, due to the inherent need to include a quantity/volume of gas that is equal to, or greater than, the volume of the package meat contents. For example, a high oxygen package comprising a barrier foam tray and clear barrier film lid, hermetically sealed to flanges of the barrier foam tray and with a 2 lb. quantity of meat sealed therein will require approximately 1 liter of gas to be enclosed and sealed within the package to ensure that an approximate 10 day shelf life extension can be provided. Said gas (referred to as modified atmosphere) will typically comprise 80% Oxygen and 20% Carbon Dioxide but other combinations that may include relatively small quantities (say <10%) of residual atmospheric nitrogen are also typical. The relatively high level of $CO_2$ (when compared to ambient atmosphere) is provided to inhibit bacterial growth, and with good storage temperature control, a shelf life for ground, fresh meat can be extended to over 10 days from packaging. The bacterial controlling effect is a consequence, in part, of a characteristic of bacteria entering a "lag phase" when the environment in which it is placed, significantly changes. Eventually, the bacteria will adapt to the atmosphere that is present and commence normal reproduction and extended infection. The shelf life extension will vary according to several factors including, for example, the following: storage temperature, i.e., the less variation from a minimum temperature of approximately 29.5° F. is optimum, (while ensuring that freezing of the meat, which occurs at about 26-27° F., does not occur); the condition and age of the meat at packaging, the conditions at the point of packaging such as hygiene, temperature etc., muscle type and age of animal from which the meat was harvested. Nevertheless, a shelf life extension of 10 days is readily reproducible when conditions are maintained as required. After a relatively short period of time, the $CO_2$ provided within the package will dissolve into the water and oils contained in the meat and the oxygen is present to ensure that a consumer appealing/acceptable "bloom" or "redness" is maintained. The "bloom" is caused by the natural color of oxymyoglobin and oxyhemoglobin that is present in freshly cut meat but when oxygen is present, after approximately 0.9 to 10 days discoloration such as browning due to increased levels of surface metmyoglobin will occur, rendering the product unsalable or requiring a reduction in price to sell to a consumer. Furthermore, the excessive volume of the finished packages, results in excessive packaging material and shipping costs and display case space at retail outlets and also excessive costs incurred for disposal of additional cardboard, etc., at the supermarket outlets.

Effective packaging materials for existing, extended shelf life, retail packaged, case ready perishable goods are often relatively expensive and the associated packaging processes are typically labor intensive. The use of EPS and FP can provide desirable low cost packaging materials but the inherent cell structure of these materials can retain residual oxygen (from air) within the cell structure, even during and after exposure to very low levels of air pressure (vacuum). When EPS and FP materials are used in low residual oxygen modified atmosphere packaging, such as described in U.S. patent application Ser. No. 09/039,150, residual oxygen can diffuse and exchange from the cell structure, and become present as a free gas within the master container thereby elevating the level of oxygen present therein to a potentially undesirable level. As described in the subject matter of U.S. patent applications in the name of the present inventor, apparatus for minimizing the level of residual oxygen retained in the cell structure and master containers are disclosed. However, such a process of gas exchange is problematic and difficult to reliably maintain. Therefore, packaging fabricated from solid plastics sheet, may be more efficiently employed in this present application.

Conventional "master container" or "master package" modified atmosphere packaging (MAP) systems include loading perishable goods into trays and then a plurality of loaded trays are subsequently placed into a larger "master container" which may be manufactured from a suitable gas barrier material. The "master container" is typically evacuated of air and then filled with a gas blend that may include a mixture of any desirable gases which may include, for example, 40% carbon dioxide and 60% nitrogen for a low oxygen MAP system. The master container is then sealed with loaded trays to provide an airtight, sealed master container, containing loaded trays and a gas blend with a residual quantity of atmospheric oxygen. Most desirably, for low oxygen MAP systems, the residual quantity of atmospheric oxygen will not exceed an amount of 100 to 300 PPM (parts per million) with the balance of the gas blend including nitrogen and carbon dioxide and/or other inert or oxygen free gases. Low cost packaging materials include foamed polystyrene (EPS trays), however, the choice of material for tray manufacture must exclude materials (unless treated in a manner that will substantially remove atmospheric oxygen from the cell structure), such as expanded (foamed) polystyrene (EPS), that have a capacity to "retain" air, even after exposure to a high vacuum as may occur in packaging processes. Therefore, in order to maintain the residual quantity of atmospheric oxygen at not more than 100 PPM, untreated expanded (foamed) polystyrene (EPS) or FP trays cannot be easily and efficiently used. By way of explanation, EPS trays are typically thermoformed from extruded EPS sheets. A typical method of producing an EPS sheet is to "foam" the melted (liquid) polystyrene by injection of a foaming agent, such as nitrogen, carbon dioxide or pentane, into liquid polystyrene thereby causing it to foam (become frothy, with bubbles and/or tiny gas filled cells within the foam) and then extrude the foam through a slot in a flat or annular die. The extruded EPS can then cool and solidify into a sheet that can be slit and wound onto a roll prior to further processing. Immediately after extrusion of the EPS sheet, cells retained within the foam are filled with nitrogen or other gas (foaming agent) used in the foaming process. However, such a foaming agent gas, if not retained by other means in the cell structure, can quickly exchange with the ambient air during storage and the cells can become filled with air. When placed within a vacuum chamber and exposed to a high level of vacuum, as is normal in a "master container" packaging process for low oxygen MAP systems, cells can retain a quantity of air, even during and subsequent to evacuation (unless the exposure to vacuum is significantly extended to the extent required). The retained quantity of air in the cells, can subsequently exchange with gas within the sealed "master container" which can, thereby, elevate the residual oxygen content of the "free" gas contained within the "master container" above a desirable level.

A fundamental need that resulted in the development of thermoformed EPS trays initially arose in the modem supermarket. Fresh meats and poultry were processed and retail packaged at the supermarket immediately prior to retail display and sale. EPS foam trays were developed to meet these supermarket requirements, and have provided a functional and low cost retail package, when "overwrapped" with a low cost web of plastic material such as plasticized PVC. However, with case ready MAP systems, such EPS trays are now required to be shipped in trucks and other means of transport from the point of packaging, which may be located many hundreds of miles from the point of sale. Abuse and damage can occur to the packaging during this shipping. In an effort to protect against damage, rigid and heavy weight cartons with sheets, cushions and/or columns, made from suitable materials such as chipboard are manufactured and assembled with EPS trays and goods contained therein. Such protective packaging is expensive, bulky and results in excessive shipping costs. Furthermore, excessive packaging, as required for the sole purpose of protection during shipping, must be discarded at the supermarket thereby creating excessive waste disposal problems with the attendant costs to the environment. It would therefore be desirable to produce rigid packages and containers that can withstand the abuse of long transportation routes.

Typically meat packing companies slaughter cattle and then process the dressed carcass by chilling and then disassembling the carcass into portions of meat which can then be, in part, delivered to the point of sale to consumers, in vacuum packs. However, approximately 40% of the disassembled meat is processed by coarse grinding and then blended to provide ground meat with a selected with a selected fat and lean content as required by the retailer. The fat and muscle content of the ground meat may be, for example, 20% fat and 80% lean. Typical current processing methods require that the boneless meat be firstly coarse ground then blended, vacuum packaged, delivered to a supermarket or packaging facility close to the consumer where the coarse ground meat is fine ground and then retail packaged immediately prior to retail display. This conventional process inherently results in excessive exposure of the ground meat to ambient atmosphere including oxygen during the grinding and blending process at the point of slaughter. Furthermore, this process requires that relatively large quantities of ground beef are blended together in a single batch. Because it is not possible to disassemble a carcass and provide boneless meat therefrom with a precise and selected ratio of fat to muscle tissue, the typical batch blending process often requires several attempts to produce the desired ratio of fat to lean content. The general industry practice is to deposit selected boneless beef with a fat to lean ratio as close to a desired tolerance as possible. The selected boneless beef may have a fat to lean ratio of 15% fat to 85% lean +/−5%. Typically, a sample of the blended boneless beef is then removed from the blender and then can be tested to determine fat and lean content using, for example, a device known as an Analray testing procedure. After determining the fat and muscle content of the coarse ground meat, additional fat or lean meat is added to the batch blender and the full batch is again blended for a period of time and then a second sample is extracted and tested to determine fat and lean content. If the fat and lean content is as required at this point, the batch of coarse ground meat can be vacuum packaged and stored in refrigerated facilities prior to delivery to the point of retail sale. However if the fat and lean content is not as required, then, additional fat or lean meat can be added to the batch and further mixing is then required. This process is often repeated as many as 5 times or more. Each time the coarse ground meat is blended again it is damaged by the blending process. This damage may include "fat smear" or over heating. Heat is generated during this blending process and "fat smear" occurs when the meat has been exposed to excessive blending. This procedure is expensive in terms of energy, labor and equipment time. Furthermore, damage to the ground meat is undesirable and yet damage typically occurs as a matter of normal process with the currently predominant industry procedures. During the process described above the meat is exposed to ambient air and bacteria such as *E. coli* 0157:H7 and other dangerous bacteria can be present in the blended ground meats. Excessive blending can cause the bacteria to spread throughout the batch of meat in the blender.

Ground meat such as ground beef is produced by processing selected portions of boneless meat, including fat and muscle tissues, through a grinding machine. The relative quantities of fat and muscle contained in any batch of the portions of boneless meat is typically arranged to correspond with set industry standards. The batch of boneless meat may include about 93% muscle tissue and therefore the balance of about 7% would be fat. The following TABLE 1 of items 1 to 5, shows the fat and muscle tissue content of some typical industry specifications for boneless meat:

TABLE 1

| Item | Muscle Tissue | Fat Tissue |
|---|---|---|
| 1 | 93% | 7% |
| 2 | 90% | 10% |
| 3 | 75% | 25% |
| 4 | 65% | 35% |
| 5 | 50% | 50% |

Although the industry standards are established, it is difficult to produce large quantity of boneless beef to any specification or ratio of fat and muscle. This difficulty can arise as a result of genetic variation in the animals from which the boneless meat is harvested. Consequently, there is often variations that could be as much as +/−2% to 3%, which corresponds to a possible variation of up to 6% and perhaps even more, in the actual fat or muscle content of the boneless meat.

Typically, consumers can purchase fine ground beef with a fat content that is specified and clearly marked on any retail package. The fat content may be specified to 10%, 25%, or 30% and it is illegal, in several U.S. states, such as California and New York, to sell such retail products to consumers if the fat content is higher than the amount shown on the retail package. Therefore, producing retail packages of ground beef with a fat content of, for example, 25%, may be achieved by grinding a known quantity of Item 2 (listed above) and blending this with a known, measured and corresponding quantity of Item 4 (listed above). The fat content of the resulting ground beef can be measured but it is common for the fat content variation in the initial quantity of the boneless beef items to vary to such an extent that a compensating procedure must be accommodated during production of the product for retail packaging. This compensating procedure can often result in production of ground beef that has a muscle content that is higher than is specified on the retail package. The consumer, however, only pays for the ground beef according to the fat content shown on the retail package. Thus a loss of profit for the ground beef producer can be incurred.

Typically, a quantity of boneless beef, with a specified muscle and fat content, for example, Item 5, is loaded into a hopper which is connected directly to a primary meat grinder. The portions of meat are progressively carried, by augers and compressed into a tubular line with a perforated grinding plate fitted across. The grinding plate is typically manufactured from suitably hardened steal and the perforations may include drilled and reamed holes of a chosen diameter, which may be about 0.5" diameter, and which extend completely through the grinding plate. The primary grinder typically produces coarse grinds with the diameter of the meat pieces corresponding with the diameter of the drilled and reamed holes in the grinding plate.

After primary grinding a quantity of Item 5 may be blended with a selected quantity of coarse ground Item 4. After the blending of Item 5 with Item 4 the resultant mix is processed through a secondary fine grinding machine prior to portioning and retail packaging. The secondary fine grinding machine may be similar to the primary coarse grinding machine except that the grinding plate can be drilled and reamed with holes of less than about 0.25" diameter.

Typical fine ground meat for retail packaging and sale to consumers may be produced with fat and muscle content as shown in the following TABLE 2:

TABLE 2

| Item | Muscle Tissue | Fat Tissue |
|------|---------------|------------|
| 1F   | 90%           | 10%        |
| 2F   | 75%           | 25%        |
| 3F   | 65%           | 35%        |

The existing grinding, blending and processing equipment, such as that made by the Weiler/Beehive Company, has been demonstrated as effective for grinding meats of various types. However, little has been proposed to improve the quality of the ground meats by, for example, arranging equipment in such a manner so as to substantially prevent contact of the ground meats with air and/or atmospheric oxygen during the grinding and blending processes. The conventional equipment does not allow for continuously and automatically grinding, measuring and blending the ground meats in such a manner so as to continuously produce quantities of ground meats to an exact and predetermined muscle and fat content. In particular, nothing has been proposed in the way of automatically controlling the fat content.

The present invention provides methods, systems and apparatus to automatically and continuously grind, condition, blend, treat and package the ground meat products with improved accuracy of muscle tissue to fat tissue ratio, so as to minimize losses to the processor. The ground meat can then be packaged in suitable packaging that will enhance the keeping qualities of the products and provide a safer effective method of delivering the goods to consumers.

Bovine Spongiform Encephalophathy (BSE) is an incurable disease that can "jump" from cows to humans and is considered (albeit low) a threat to the US beef industry. It has been, typically, contracted by cattle as a consequence of the animal eating "blood & bone meal" that has been used as a component of the animal's feed where the "blood & bone meal" has been derived from a cow that has BSE. The practice of feeding "blood & bone meal" to cattle in their feed is now illegal in the USA and many other countries but there is still a risk of the disease being imported from a country that still allows this practice. Furthermore, a cow can become infected by eating as little as 1 gram of contaminated meal. BSE has been reported in 18 countries and is a threat to the US beef industry. BSE is not believed to be contagious and can only be contracted in humans by consuming of a part of the cow. "Foot and Mouth" or "Hoof and Mouth" is also another threat to the US beef industry and all other cloven foot animals.

Some one billion lbs. of boneless beef is imported from Australia and New Zealand into the USA annually. US federal legislation may someday dictate the requirement to display information on the retail pack to consumers and show the country of origin as well as all other details as, among other things, a guard against illegal imports from banned source countries such as China.

Global Animal Management (GAM) is a company owned by Schering Plough that has established a system and large computer database that is intended to record all information about a beef animal from birth to slaughter. Unfortunately, the value of this information is lost at all US slaughtering plants because they cannot trace the animal through the packing plant disassembly process.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

The present invention relates to methods and apparatus, and the products made therefrom from processing and packaging under conditions of reduced oxygen for substantially decontaminating and prolonging the shelf life of perishable goods, such as beef.

One broad aspect of the present invention provides for minimizing discoloration of meat due to the formation of metmyoglobin, which occurs as a result from the oxygen released after packaging due to the reduction of oxymyoglobin into oxygen. Therefore, one aspect of the present invention provides methods and apparatus for minimizing the exposure of freshly portioned beef, either freshly sliced or ground, with oxygen. In this manner, freshly ground or sliced beef is packaged with reduced levels of oxymyoglobin present. To this end, a conduit is provided with any suitable gas, devoid of substantial amounts of oxygen. The conduit comprises any and all equipment used in processing and/or packaging the beef. In this manner, meat is packaged in a state that includes relative high amounts of deoxymyoglobin rather than oxymyoglobin. An example of a suitable gas that may be used to practice the invention includes carbon dioxide. The conduit filled with suitable gas is provided from, in some instances, the point of grinding or blending and continues through the point of packaging. However, it is to be realized that any amount of time spent in a suitable gas will result in some benefit to the beef. In this manner, the amount of oxymyoglobin formed on the beef is maintained at a level that does not result in sufficient quantities of oxygen that after packaging would cause the discoloration or formation of oxymyoglobin of the meat to such an extent that the consumer would reject the item.

A further broad aspect of the invention concerns improved packaging for food items that are packaged under controlled or modified atmospheres. One such food package is produced that occupies less volume and is sturdier than conventional packages. Furthermore, trays made in accordance with the invention require less material, yet are rigid to withstand the abuse over long transportation. One such tray material is extruded polypropylene (co-polymer) sheet. Some instances of trays are provided with channeling apertures; however, other trays can be provided without them. Some instances of trays are foamed, including cells with gas that can be exchanged with more suitable gasses. However, other trays are solid, not requiring foam cell gas exchange.

Further broad aspects of the invention relate to a method of storing and communicating all the information that pertains to a particular animal carcass onto a container which contains the beef harvested from the particular animal. To this end, certain of the trays made according to the invention are identified with unique markings the information from the animal is then keyed to each tray. In this manner, the information in the form of a readable device can be carried along with the particular container as the container makes its way in the distribution chain. The information can also be read and stored in a memory bank, and made accessible to all who desire to know such information, such as by the Internet. In one instance, particular use of this information is made for setting a price for the goods at the point of retail or for determining its shelf life. In this manner of pricing, the information can be verified in two ways by reading the tag on each container and also by accessing the information via the communication system. A method of tracing a good from a harvested animal includes associating information pertaining to the animal on a carrying means for the animal or any of its divisions. This information could be stored on an RFID tag and include such information as country of origin, place or originating location of the animal. In this way, a label can be prepared by being able to trace the origin of the packaged good through the disassembly process.

In one broad aspect, the methods and apparatus of the present invention are directed at saturating or at least dissolving $CO_2$ into fresh meat prior to packaging. And further still, any exposure of the meat with oxygen is sought to be minimized. Adequate $CO_2$ can be dissolved in the tissue of the meat and to such a level that the meat can become a source of $CO_2$ after packaging. This can be achieved by lowering the temperature of the meat to a minimum (about 29.5° F.) and exposing it to relatively high pressure (ambient to 200 psi or more) $CO_2$ gas. $CO_2$ gas dissolves more readily at lower temperatures and therefore a part of the method is to expose the meat to high pressure $CO_2$ at the lowest temperature above freezing and then retail package the meat in a tray, then overwrapped with a highly gas-permeable web of material such as pPVC. If an extended shelf life of say not more than 10 days is adequate, then a barrier pouch master container may not be needed, the $CO_2$ gas "entrained" in the meat tissue prior to packaging will gradually be released immediately after removal from a higher pressure to ambient and as the temperature elevates during delivery to the point of sale and this can be sufficient to inhibit bacterial growth and atmospheric oxygen in unlimited quantities is available to maintain the requisite "bloom." In this way, shipping, packaging and display costs can be reduced substantially, while providing an extended shelf life that may be sufficient for some industry packers and supermarkets.

In one broad aspect, the present invention provides methods, systems and apparatus to automatically and continuously process meat products with sanitizing and bacteria count reducing agents that include the measured and controlled quantities of processing aid water. The system can be directly coupled to the aforementioned meat grinding, conditioning, treating and packaging equipment so as to provide a substantially enclosed system thereby providing a safer and effective method of delivering the goods to consumers.

In one broad aspect of the invention, a conduit is provided that minimizes the contact of freshly ground or sliced beef with oxygen. Processing of the beef, such as grinding, measuring, blending, decontaminating, slicing, cooking, packaging, tray forming, etc., therefore, progresses in a substantially oxygen deficient environment. In this manner, a gas is dissolved in the beef that results in less oxymyoglobin at the time of packaging and, consequently, less metmyoglobin formation after packaging.

A further broad aspect of the invention concerns the production of pet food made in a manner substantially similar to the food processed for human consumption in accordance with the invention. In this instance, however, much of the leftover products, such as entrails, can be used to produce pet food, resulting in a substantial benefit and value increase. In one particular aspect, the pet food can be made aseptic, resulting in a moist pet food that does not require refrigeration.

Further aspects of the invention are directed to the manner of packaging, and still further aspects are directed at cleansing entrails, such as intestines, to make into the pet food.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
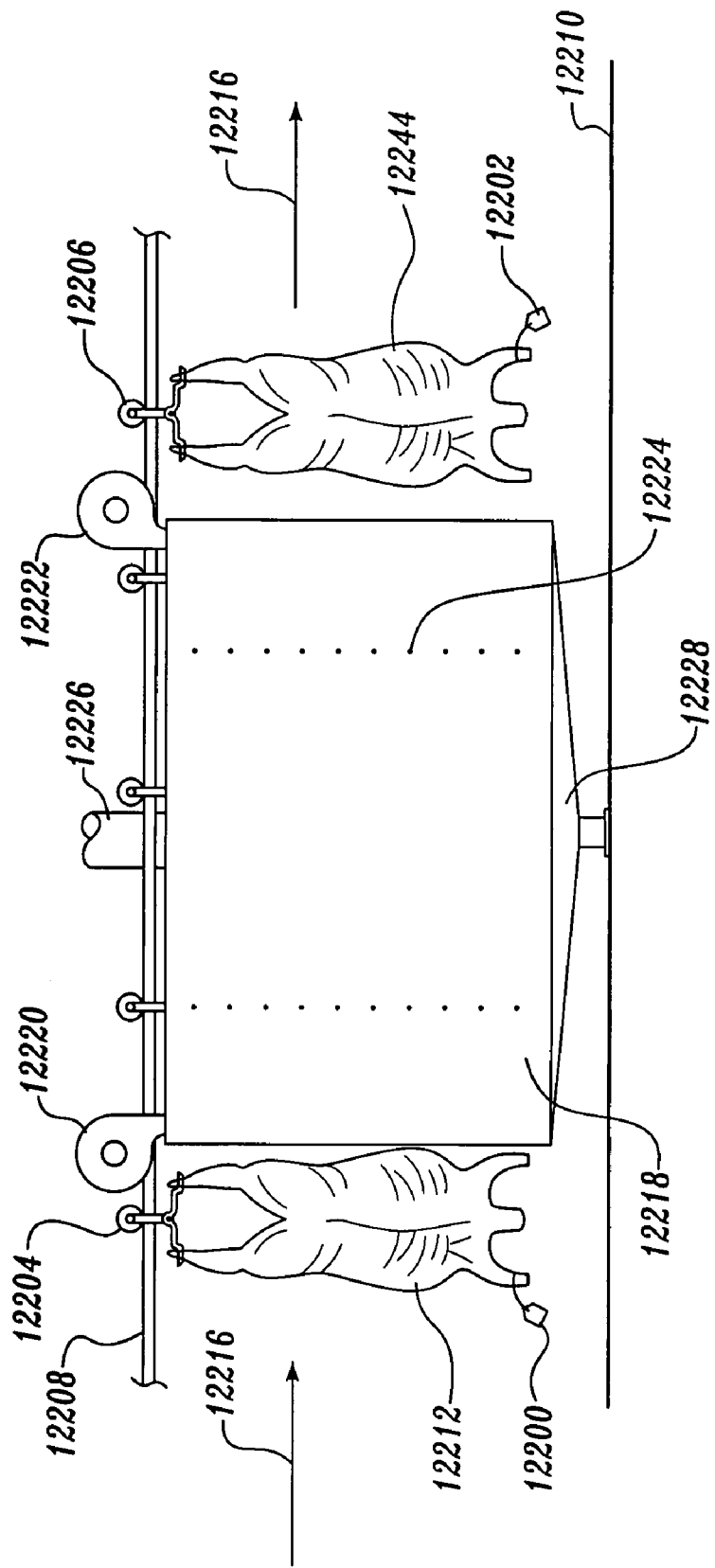
FIG. 1 shows a side illustration of a decontamination apparatus according to the present invention.

At a time when there is increasing consumer demand for natural, if possible, organic foods and an increasing regulatory requirement for reduction or elimination of artificial chemicals and preservatives in such foods, particularly meat and meat products, it is alarming to note that many proposed methods for decontaminating meat and other foodstuffs rely on the addition of chemicals not normally found in or on such foodstuffs or by irradiating such foodstuffs with ionizing radiation.

Therefore a need exists to better control the meat processing environment and the materials being processed within it so as to more effectively reduce or remove the microbial population on the materials being processed, eliminate sources of cross contamination and recontamination within that environment and simultaneously maintain or improve the meat quality and keeping quality attributes of the products processed and produced within that system. The apparatus and methods of the present invention fulfill these needs.

It is one aspect of the invention to provide for the decontamination of bone-in or de-boned animal carcass, boneless beef, primals, cut primals, ground and sliced beef and like products, but also including any other perishable item, such as fruits and vegetables, and grains and their products. While reference will be made to beef, it is to be appreciated that any other perishable goods will realize benefits if treated in accordance with the apparatus and methods disclosed herein. Decontamination and sanitizing may be used interchangeably.

One aspect of the invention provides for aseptic packages that can substantially eliminate or significantly reduce the amount of refrigeration required for the storage of certain otherwise perishable goods.

One aspect of the invention provides methods and apparatus that obviate the limitations of decontamination methods for meat which principally rely on adding powders, water, solutions or other liquids to raw meat and its sequent products such that either the volume of water added may either exceed the natural proportions normally found in raw meat and its products and/or may require labeling of the fact, accordingly.

One aspect of the invention provides a method that can enhance the decontamination capabilities of the system by changing the physical properties of the meat to make the surface less suitable for microbial growth and the microbes themselves more susceptible to the decontamination treatment and as a consequence enhance the keeping qualities of the raw meat and its products so formed.

One aspect of the invention includes pre-grinding the meat to a substantially uniform size and exposing the freshly ground meat particle surfaces to a sufficient quantity of carbon dioxide gas such that the pH at the surface of the meat is reduced to a pH of less than 7.0, and in some instances less than 5, and still other instances less than 2.8 or less. It is also an aspect of the present invention to treat the beef with a suitable narrow wavelength, germicidal UV source. Additionally, and if necessary, provision is made to add a further decontaminating component to the suitable gas flow which may be any suitable substance such as reduced quantities of any suitable salt solution, liquid or powder or chlorine dioxide or an inactive precursor to such a gas which becomes active on contacting the carbon dioxide enriched surface of the ground meat.

One aspect of the invention minimizes sources of recontamination and cross contamination within the processing environment generated or enhanced by either the action of the processing equipment itself or the enclosed atmosphere within which the processing operations occur. This can be accomplished, for example, by cleaning in place all such processing equipment which comes in contact with the food item. According to the present invention, a substantial portion of the processing equipment is enclosed, thereby providing an efficient means to flood the conduits with a suitable decontaminating gas, such as ozone, chlorine dioxide and the like. In this manner, the decontaminating agent reaches all contact surfaces and provides aseptic conditions for the processing and packaging of beef. In this environment, the bacterium *E. Coli* 0157:H7, can be either killed or, should the bacterium be injured in the decontamination step and then be deprived of oxygen, in some instances, it will subsequently die in an oxygen free environment. The inventor of the present subject matter theorizes that this strain of bacterium will be injured and put in a weakened state, making it more susceptible to the lack of oxygen. Therefore, in one embodiment, a vessel wherein the beef is treated with a decontaminating agent, such as ozone and/or chlorine dioxide, will either kill or place the bacterium in an injured state, so that the ozone treatment vessel can be followed with a vessel wherein a substantially reduced oxygen environment is provided. In one instance, the reduced oxygen environment can be as low as 5% oxygen and 95% carbon dioxide. However, other embodiments can provide for an oxygen concentration of less than 1% down to about 10 ppm or even less than 3 ppm. In this manner, due to the injured condition of the bacterium, after having been exposed to a decontaminating agent, the reduced oxygen environments which are herein described for the treatment of beef will increase the potential to kill the *E. coli* bacterium.

One aspect of the invention provides a method which utilizes the mechanical action of the processing operation to keep the processing equipment as clean and debris free as practically possible and substantially continually present all exposed surfaces to a suitable physical decontaminant, such as UVC on its own or in conjunction with reduced quantities of solutions, liquids, powders or carbon dioxide gas that may contain an effective quantity of decontaminating agent or agents in active or precursor form, such as chlorine gas, chlorine dioxide, ammonia, hydrogen peroxide, acidified sodium chlorite and anti-oxidants. The atmosphere can be maintained aseptic by any suitable method using any suitable substances which may include a combination of the mechanism of forming the carbon dioxide, passing the carbon dioxide through suitable physical filters and then exposing the suitably filtered gas to a suitable germicidal UV source before entering the processing environment.

One aspect of the invention minimizes oxidation reactions or the rate of oxidation reaction occurring within the product and thus maintain the highest meat quality attributes or even enhance the meat quality.

One aspect of the invention provides a method which undertakes all material grinding operations, material measurement operations, material adjustment and blending operations in a substantially enclosed environment of carbon dioxide or carbon dioxide with other gases or substances to the substantially complete exclusion of oxygen and may include the provision of a suitable means to monitor and maintain the substantially complete exclusion of oxygen without the need for any evacuation step nor a need to significantly alter the atmospheric pressure within the processing environment while excluding substantially any presence of natural or artificially generated light of any wavelength except that which may be generated by the narrow wavelength UV sources used to generate a substantially aseptic atmosphere within the substantially enclosed processing environment. This method can be further enhanced by accurately monitoring and controlling the processing temperature to ensure it substantially remains in the range $-2°$ C. to $0°$ C. or if processing operations cause deviation from the desired range, it returns to the set temperature as quickly as possible thereafter.

Another aspect of invention provides apparatus and methods of disinfecting raw red meat, white meat, and any other suitable food stuff, any individual component thereof, and/or any resultant processed product, the processing environment, any associated equipment and the associated processing by means of a carrier gas which itself acts as a microbiostat and microbiocide, in the presence of one or more decontaminating agents which themselves may be a gas or a gas in a precursor form, in the presence of a sterilizing atmosphere generated by and maintained by germicidal UV, in the absence of visible light and under tightly controlled temperatures in such a manner as to enhance the overall effectiveness of treating beef.

In accordance with one aspect of this invention, it has been found that exposing meat surfaces to an introduced atmosphere predominantly of gaseous carbon dioxide during all practical stages of processing has resulted in a significant reduction in the total numbers of viable microorganisms compared with meat not so treated. For the purpose of definition, the carbon dioxide atmosphere means an atmosphere which is predominantly carbon dioxide but may also contain amounts of other gasses including air, nitrogen and noble gases such as argon, krypton, xenon and helium but significantly excluding oxygen. It may also include additional gaseous components. For the purpose of definition the term 'additional gaseous components' may include but is not limited to chlorine, chlorine dioxide or ozone. However the composition of the carbon dioxide in the total introduced atmosphere will always exceed the combined total of the other gaseous components by at least a ratio of 2:1 and in some instances 4:1 or more. In one instance, the atmosphere is exclusively carbon dioxide with or without any additional gaseous components added in a concentration sufficient to induce a synergistic microbiocidal effect.

This effect is further believed to be enhanced by the various stages in the processing operations including but not limited to the grinding, cutting, blending and agitation processes all of which ensure that substantially all new surfaces formed are thoroughly bathed in the carbon dioxide atmosphere. The operations generating the new surfaces cause an increase in the free natural moisture on the combined surface area of the particles, primarily due to cellular disruption and diffusion which further enhances the ability of the surface to absorb further amounts of carbon dioxide resulting in increasing acidity at the immediate surface. While the microbiocidal effect is noticeable at acidic pH values below 7.0 and in some instances below 4.0, in one instance of this aspect of the invention, the effect is maximized when the level of dissolved carbon dioxide is such that the pH at the immediate surface of the particle is 3.0 or less.

It is a further aspect of this invention that the effect is still further enhanced when the temperature of the surface of the meat is kept substantially at 0° C. or below but not lower than −2° C. such that any part of the foodstuff being processed is exposed to any substantial freezing or freeze followed by thawing. This is effectively accomplished by using the carbon dioxide atmosphere in a form which provides substantial latent heat to the operation such as a pressurized liquid or as a solid such that it additionally acts as a refrigerant during the subsequent processing operations.

By introducing the carbon dioxide atmosphere to the processing system in this manner and further allowing it to contact all food surfaces immediately as they are formed throughout the many processing operations, it eliminates the need to previously dissolve the gas in any liquid or other carrier prior to or during any contact step.

Many chemical methods which rely on, if not entirely, at least in part, the lowering of pH as a means of generating antimicrobial properties, also require the presence of carrier liquids not only to provide suitable dilutions thus preventing the introduction of deleterious physical and chemical properties to the foodstuff being treated, but also to effect an even distribution around the particle surfaces. The use of carbon dioxide atmosphere as described here is both advantageous and desirable as it eliminates all of these deleterious effects without the addition of any significant amount of carrier liquid or other medium. In some instances, the concentration of carbon dioxide environment is greater than 50%; however, in other instances, the concentration is greater than 90%, 95%, 98%, 99%, or the residual gasses make up no more than 1000 ppm, or 500 ppm or 100 ppm or 10 ppm.

In a further aspect of this invention, it has been found that with the surfaces of the meat, meat product or other foodstuff substantially exposed to the carbon dioxide atmosphere, the addition of other natural products or materials herein described can synergistically enhance the overall microbiocidal and microbiostatic effects of the carbon dioxide atmosphere alone.

In one aspect of the invention, the various stages in the processing operations including but not limited to the grinding, cutting, blending and agitation processes are not only exposed to sufficient amounts of the carbon dioxide atmosphere to achieve the pH conditions required and an excess of the gas to maintain them throughout but they are simultaneously exposed to a suitable source of narrow wavelength of germicidal UV. This exposure may be in the form of one continuous exposure throughout the processing operation or several discontinuous exposures of differing doses and duration throughout the processing operations such that a synergistic effect between the carbon dioxide atmosphere and the germicidal UV is achieved resulting in a substantially greater anti-microbial effect that can be achieved with either the same level of the carbon dioxide atmosphere or germicidal UV alone.

These conditions produce a very substantial microbiocidal reduction in both pathogenic bacteria and total viable counts for a very wide variety of foodstuffs. However, very occasionally, either when the foodstuff has a very heavy total microbial load or contains some very specific pathogens, a more extensive decontamination treatment has been necessary to ensure a satisfactory reduction for processing purposes. Such methods and materials are disclosed herein.

It is therefore a further aspect of this invention that these additional materials which may include but not limited to chlorine gas, chlorine dioxide gas, ozone all in gaseous form or organic acids such as citric, acetic, ascorbic or proprionic acids, their salts and esters or sodium chlorite in micro-droplet solution form or any other suitable decontaminating component can be introduced to the carbon dioxide atmosphere gas stream which acts as a carrier to these materials and moves them to the surface of the foodstuff. These additional decontaminating agents are applied at a concentration that would achieve the necessary level of decontamination without exceeding any regulatory limitations on the upper level of concentration used, or upper levels of residual concentration remaining in or on the foodstuff after treatment, or failing to meet statutory labeling requirements. The additional agents and strengths can be readily determined by experimentation.

As prolonged exposure to elevated levels of the carbon dioxide atmosphere and germicidal UV and any additional decontaminating agent can be hazardous to the health of human operatives working within the processing environment, it is a further aspect of the invention that these reactions and interactions occur within a substantially enclosed processing environment which minimizes any human exposure to either or both processes.

One aspect of the invention substantially decontaminates the surfaces of foodstuffs prior to commencement of processing operations, but it is acknowledged that such action may not generally sterilize the foodstuff adequately. As a consequence, without suitable preventative treatment, all the surfaces of the processing operation equipment which come in contact with the foodstuff would steadily become contaminated themselves and act as a potential source for cross contamination and recontamination of already substantially decontaminated foodstuffs. It is therefore a further aspect of this invention that most, if not all, of the processing equipment which comes in contact with the foodstuff being processed is itself subjected to a decontamination regime similar to that of the foodstuff. This may be the carbon dioxide atmosphere alone, the germicidal UV alone, or the carbon dioxide atmosphere together with the germicidal UV, or any of these in combination with but not limited to chlorine, chlorine dioxide, ozone all in gaseous form or organic acids such as citric, acetic, ascorbic or proprionic and their salts and esters, or sodium chlorite in micro-droplet solution form or any other suitable decontaminating component at a concentration that would achieve the necessary level of decontamination without exceeding any regulatory limitations on the upper level of concentration used, or upper levels of residual concentration remaining in or on the foodstuff after treatment, or failing to meet any statutory labeling requirement as the result of any such treatment.

To achieve the required level of continuous sanitation of processing equipment, the surfaces of such equipment need to be substantially devoid of physical debris and/or biofilm residue. While this is usually accomplished by the continuous movement of the foodstuff components through the processing equipment or the mechanical action of the processing equipment or the interaction between the physical surfaces of the equipment and the foodstuff components, occasionally there is a need to augment such activities to achieve the required low level of residual physical debris and/or biofilm residue. It is therefore a further aspect of this invention that mechanical and/or other physical means can be applied to the processing system equipment components as necessary. This function may carried out in the form of scrapers, brushes, air jets, water jets or similar actions where the surface to be cleaned has occasion to be presented to the mechanical cleaning action without the presence of the foodstuff or where otherwise allowable.

Alternatively, this may be achieved by one or more of the foodstuff components themselves in either an isolated form, for example, rusk, bran or other abrasive foodstuff used in a sausage or product formulation or a changed physical state for example lean meat in a substantially frozen or tempered state. These may be within a substantially continuous processing operation or between phases of a substantially continuous processing operation or in a discontinuous batch processing operation.

When carbon dioxide is supplied in an excess of that necessary to achieve the desired level of microbiocidal and microbiostatic control. Such a waste of excess material is an additional expense to operational costs. In an effort to eliminate such additional processing cost, a further aspect to this invention, allows for the excess carbon dioxide within the carbon dioxide atmosphere to be recovered and reused. This can be substantially achieved by venting the excess gas from the processing system through one or a plurality of vents and passing the excess gas back into the gas generation system through a series of necessary filters to remove unwanted gases and contaminating materials, for example an oxygen absorber to remove unwanted oxygen, an oxygen scavenger to remove unwanted residual oxygen, a scrubber unit to remove unwanted moisture and materials in solution or suspension, a filter to remove particulate matter and a germicidal UV cabinet to remove contaminating microbial organisms. Other units can be added to remove any other specific unwanted materials as necessary. The cleaned carbon dioxide atmosphere can then be reprocessed, for example, put under pressure to change the carbon dioxide component of the carbon dioxide atmosphere to a liquid or otherwise refrigerated to convert it back to a solid form. Such a final step would also allow any of other gaseous contaminants not already removed or inerts to other applied removal steps to be removed from the recovered gas. Additionally, and as a further aspect to the invention, this also serves as a method of maintaining the processing atmosphere substantially aseptic.

In a further embodiment to the invention, the introduction of an excess of the carbon dioxide atmosphere to the processing operation at its very earliest stages allows for all subsequent processing operations to be carried out in an atmosphere which minimizes or substantially eliminates the presence of air, and more specifically, oxygen. All oxidation reactions are substantially deleterious to a number of attributes related to product quality. For example, meat in the presence of air or oxygen will irreversibly change color from an initially attractive red color primarily due to the formation of oxymyoglobin to an unattractive brown color primarily due to the formation of metmyoglobin. In the presence of the carbon dioxide atmosphere and the absence of air or oxygen, an alternative purple red pigment, ferrous myoglobin is formed and is maintained in the continued absence of air or oxygen. However, the attractive oxymyoglobin is easily formed when the meat is exposed to air in a controlled manner, for example, within a modified atmosphere package.

A further advantage of the presence of the carbon dioxide atmosphere and the absence of air or oxygen is the minimizing or elimination of deleterious biochemical and chemical reactions within the foodstuffs which result in a reduced keeping quality of the foodstuff, an increased likelihood of the generation of off-flavors and off-aromas due to the formation of oxidation products and the generation of an atmosphere more favorable to the growth of any residual aerobic microorganisms which themselves generate different but additional off-flavor and off-aromas.

In a further aspect to this invention, all processing steps which include the presence of germicidal UV are carried out in an atmosphere substantially of carbon dioxide and to the exclusion of oxygen or air. Germicidal UV is a known oxidizer and under specific conditions particularly in the presence of foodstuffs which are low pH and/or contain components capable of substantial oxidation such as unsaturated fats, germicidal UV can initiate undesirable accelerated actinic oxidation reactions. The presence of a substantially air or oxygen free atmosphere will minimize or eliminate these effects. However, while nitrogen or other inert gases can achieve such an atmosphere, and would permit germicidal UV to have a decontaminating effect on its own, they do not allow the immediate surface of the meat or other foodstuffs to become sufficiently low in pH to enable the synergistic microbial reduction reaction to occur as when germicidal UV and carbon dioxide are simultaneously present.

In a further aspect to this invention, all or most of the processing operations are undertaken in an environment also substantially devoid of natural or artificial light except for that generated by germicidal UV or as a consequence of the generation of germicidal UV. Light or more particularly reactions such as photo-oxidation or photo degradation which reduce overall meat quality are initiated, amplified and/or accelerated by the presence of natural light and certain wavelengths of artificial light. Germicidal UV alone does not generate such an oxidizing environment.

It is a further aspect of this invention that the biocidal effect is still further enhanced when the temperature of the surface of the meat is kept substantially at $0°$ C. or below but not lower than $-2°$ C. such that any part of the foodstuff being processed is exposed to any substantial freezing or freeze followed by thawing.

The early provision of a controlled and defined atmosphere also allows for that aseptic atmosphere to be maintained throughout all processing operations. It also permits the aseptic atmosphere to be continuously or subsequently modified so that the product is substantially in its final defined and desired atmosphere at the time it enters its packaging operation. This has a double benefit. Firstly the aseptic nature prevents any product recontamination or cross-contamination as the product moves between processing and packaging operations thus maintaining the very highest level of product safety. Secondly, it eliminates the need for the customary evacuation cycle at the time of final packaging when the existing atmosphere is removed and replaced by a defined atmosphere within which the product is sealed during any final packaging operation.

It is a further aspect of this present invention that the carbon dioxide atmosphere in which the product substantially undergoes its processing operations is monitored and controlled or monitored and adjusted, either in a single step or in a series of smaller controlled steps so that the finished or final product is predominantly surrounded within the desired final packaging atmosphere at some suitable point during the processing operation and before it enters any final packaging operation. However, other embodiments may still provide for the packaging operation to be done in the final environment.

In one aspect of the invention, sanitizing, de-contamination, and pasteurizing as described in the methods herein are carried out substantially prior to grinding and are carried out in a continuous manner, meaning that the transfer of the boneless beef from the sanitizing conduit/vessel to the grinder is substantially direct (as would occur in an enclosed conduit) so as to minimize any delay between sanitizing and grinding. The grinding process increases the surface area of the meat by several hundred fold, which exposes substantially increased quantities of surface liquid which can then mix with the sanitizing agent thereby affecting the pH which can minimize oxidation, which is desirable. With such agents as acidified sodium chlorite, the increased surface area/surface liquid will lower the pH, which is desirable and will immediately reduce oxidation.

4.3.1. EMBODIMENT

Referring now to FIG. 1 a side view of an apparatus that can be used to surface treat freshly slaughtered (pre-rigor) animal carcasses that are intended for human consumption, is shown. Carcasses harvested from identified live animals with all details of origin that meet any legal requirements can be marked with any suitable markers and/or tagged with tags 12200 and 12202. The tags may comprise any suitable programmable chip, barcode, radio frequency (RF) tag or suitable means of recording detailed information as needed and can be attached to the carcass or to the roller assemblies 12204 and 12206. The detailed information can be arranged in readable form so as to allow accurate transfer to any other information record that can be attached to each and all items derived from the original carcass from which the items are sourced. In this way, all legally required information relating to any item derived from the original carcass can be retained and attached to all items derived from the live animal with it's source information retained by each item at all times prior to human consumption of the items. Further description on how to trace the information associated with a particular animal carcass to the final packaged product is provided below.

Referring again to FIG. 1, rail 12208 is mounted at a suitably elevated location above floor 12210 in a refrigerated room or enclosure, in some instances, maintained at a selected temperature such as about 40° F., by suitable refrigeration equipment. However, other suitable temperatures can be used. Carcasses such as are shown as 12212 and 12214 are suspended on rollers 12204 and 12206, respectively, such that the carcasses can be moved by automatic drivers and transferred in the direction shown by arrows 12216 at a continuous rate or intermittently.

An enclosure 12218 is located on along the path of travel of carcasses, such as carcass 12212, wherein carcass 12212 can be made to pass into enclosure 12218. Enclosure 12218 includes vertically disposed sides 12218 arranged in relative close proximity to the carcasses as they are transferred along rail 12208 and in such a manner so as to substantially retain any gas or liquid that may be sprayed within said enclosure. "Air curtains" 12220 and 12222 supplied by blowers or vacuums are mounted at each upper end of the enclosure and arranged to minimize escape of any gas or substances that may be sprayed within the enclosure 12218. A lower side cover 12228 with a drain mounted therein is located along the lower section of the enclosure 12218 and nozzles 12224 are provided in the side 12218. Nozzles 12224 can be used to inject gases and/or liquids such as ozone and $CO_2$, or any other suitable gases into the enclosure 12218. A vent 12226 is mounted at the upper side of the enclosure 12218 and a powered extractor fan or impeller can be provided in such a manner so as to cause the extraction of any gases or vapors from within the enclosure 12218 as may be required. In this way, any suitable gas such as ozone and carbon dioxide or gas mixtures containing ozone, chlorine, $CO_2$ or any combination of suitable bactericide gases can be provided within said enclosure and in such a way so as to reduce the quantity of any undesirable bacteria that may be present on the carcasses that are transferred through said enclosure 12218.

Immediately after transfer through enclosure with side wall 12218, carcasses can be transferred either to a chilling room where rigor mortis will occur to the carcass muscle and body matter, or alternatively the carcasses can be transferred directly to a disassembly area so that the carcass can be broken down into smaller components such as primal pieces or boneless meats prior to rigor mortis occurring. The process of breaking will be described in greater detail below.

Figure 2:
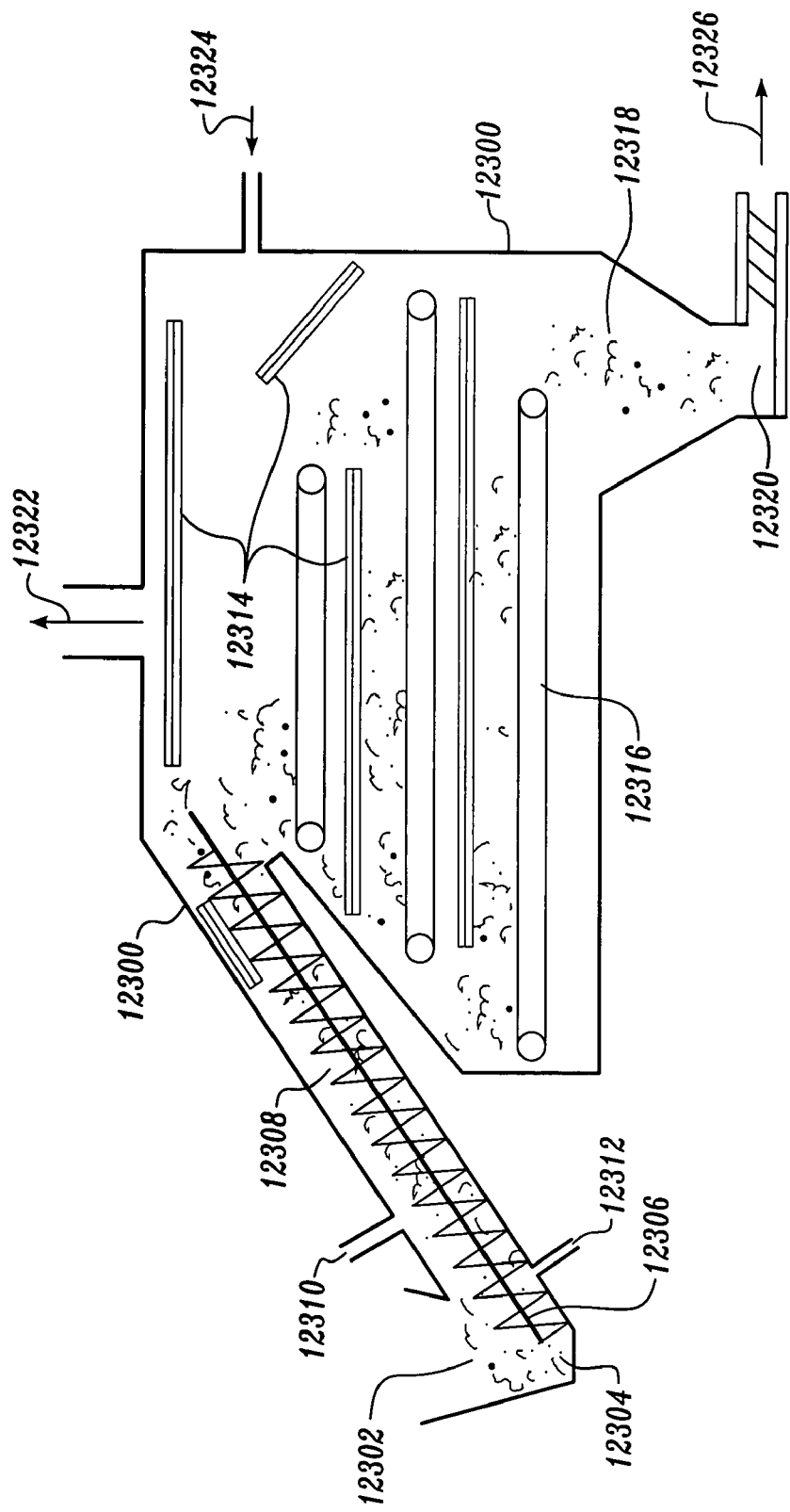
FIG. 2 shows a cross section illustration of a decontamination apparatus according to the present invention.

Referring now to FIG. 2, a view of a meat processing and de-contamination apparatus constructed to provide a process for sanitizing boneless meat such as beef, prior to and in some instances immediately prior to grinding in an enclosed system that substantially excludes oxygen. FIG. 2 shows a cross section through an enclosure 12300. Enclosure 12300 includes a boneless beef (meat) loading hopper 12302 shown with boneless beef 12304 provided therein. An elevating screw or other suitable elevating mechanism 12306 is mounted within an upwardly disposed conduit 12308 which is attached to and forms an integral part of an enclosure 12300. A selected gas is provided within the free space contained within enclosure 12300. The selected gas may be carbon dioxide but may comprise any suitable gas or decontaminating agent, described above, at any suitable temperature and gas pressure. An entry port 12316, to allow loading of sanitizers such as SANOVA, any acidified sodium chlorite substance and any other suitable sanitizing substance whatsoever, that may be approved by USDA or FDA authorities, into conduit 12308, is provided. Any convenient number of entry ports may be provided in conduit 12308. Additional entry ports, such as 12312, for liquid carbon dioxide injection, which may comprise injectors as provided by BOC Gases, can be provided at any suitable position. Lower portion of screw 12306 is in communication with meat hopper 12302 so as to elevate any boneless beef therein, while upper portion of screw 12306 unloads onto a horizontal conveyor. Horizontal conveyor is located near the upper roof of enclosure 12300. Ultra violet C emitting apparatus, shown as 12314 is located above and in suitably close proximity to the boneless beef and at any convenient location within the apparatus shown in FIG. 2, as the boneless beef is transferred from the screw along the horizontally disposed conveyors 12316. Conveyors 12316, that are horizontally disposed are arranged to carry boneless beef at a suitable velocity beneath the UVC generators 12314. In one aspect, there are a total of three horizontal conveyors 12316, wherein a UVC generator 12314 is positioned above and adjacent to each of the horizontal conveyors 12316. However, other embodiments may have more or less conveyors, depending on the length, and the amount of duration desired for exposure to the UVC radiation. Any amount of UVC radiation produces an effective and beneficial result, and may be determined experimentally for any application. The conveyor 12316 may be arranged in any suitable configuration such as shown, horizontally disposed and located one above the other as shown in FIG. 2. The conveyors 12316 can be arranged to carry the boneless meat product along conveyors 12316 in alternating directions and allowing the boneless beef to drop onto another conveyor located immediately below and arranged to carry the boneless beef in any suitable direction prior to depositing the boneless beef onto yet another conveyor located beneath the previous conveyor. UVC is generated and directed onto the boneless beef and in such a manner as to maximize death of any anaerobic or aerobic bacteria. The amount of exposure to UVC radiation is readily determined by experimentation. It should be noted that pathogen bacteria is particularly labile or prone to death when exposed to UVC light. Furthermore, death of the bacteria is most effective when the pH at the surface of the meat is low, within the acidic range. Therefore, a gas such as $CO_2$ enhances the likelihood of the UVC killing bacteria that may be present when the $CO_2$ dissolves in water at the meat surface and contained in the meat, thereby forming carbonic acid. The addition of a bactericide such as sodium chlorite that will release bacteria killing chlorine compounds upon contact with water or a solution of citric acid. Such release can result in the production of hydrochloric acid and hypochlorous acid. Therefore, by following the above procedure, the pH at the surface of the boneless meat can be reduced as may be required, according to the quantities of sodium chlorite and carbon dioxide made available.

From the lowermost horizontal conveyor 12316, the boneless beef is transferred to transition piece 12318. A meat grinder 12320 is shown attached directly to the transition piece 12318 in a gas tight manner.

An exhaust duct 12322 is conveniently located at an upper location on the roof of apparatus. An additional gas entry port 12324 is located on a wall of the apparatus. The direction of flow of a sanitized stream of ground meat is shown by arrow 12326 leaving the apparatus after optionally being ground and the stream of boneless beef can be retained within an oxygen free conduit for transfer into other apparatus (not shown) for further processing in any desirable manner.

Several of the systems as described in association with FIG. 2 may be arranged in an adjacent grouping so as to produce two or more streams of sanitized ground meat for subsequent automatic blending, according to the description provided herein. However, direct contact of raw meat, particularly raw red meat and red meat products, with either solid or liquid $CO_2$, results in freezer burn at the point of contact which is displayed as a loss of color as well as localized freezing. Also, the rate of addition needs to be carefully controlled to maintain the required physical conditions. None of the published methods include the provision of eliminating oxygen, air and other undefined gases as included in the present invention to improve performance particularly those related to maintaining meat quality attributes.

Ozone is a very strong oxidizing agent and in addition to the loss of color, it can also initiate deleterious auto-oxidation reactions in the meat, more particularly red meat which significantly reduce its quality attributes and especially customer appeal. Thus its use on red meat and its products has been extremely limited and while color loss is not as much of a problem on white meat and fish meat, the fat complement of such meats renders them more susceptible to the generation of deleterious oxidation products more so than that found in most red meats and at a much faster rate. Finally, conventional processes of decontamination of foodstuffs utilize some degree of chemical and/or physical mechanisms that use oxidation and/or denaturation reactions to achieve their main aims. One of the greatest causes of loss of meat quality in raw meat is oxidation reactions. These mechanisms are well described in most classic meat science text books. Thus, any process which induces oxidation and/or denaturation reactions will be deleterious to the maintenance of meat quality attributes and keeping quality as are processing which add additional moisture to the raw material as a consequence of their activation mechanism, i.e., the use of water to carry the active agents to the site where the action is required. In such circumstances, methodologies that minimize such reactions as well as limiting them solely to the sites of interest rather than an indiscriminate decontamination action on all materials, i.e., total volume rather than contaminated surfaces alone are to be achieved. The use of germicidal UV is one such mechanism. Thus, the primary source of loss of meat quality and keeping quality is oxygen and byproducts generated by oxidative reactions.

Figure 3:
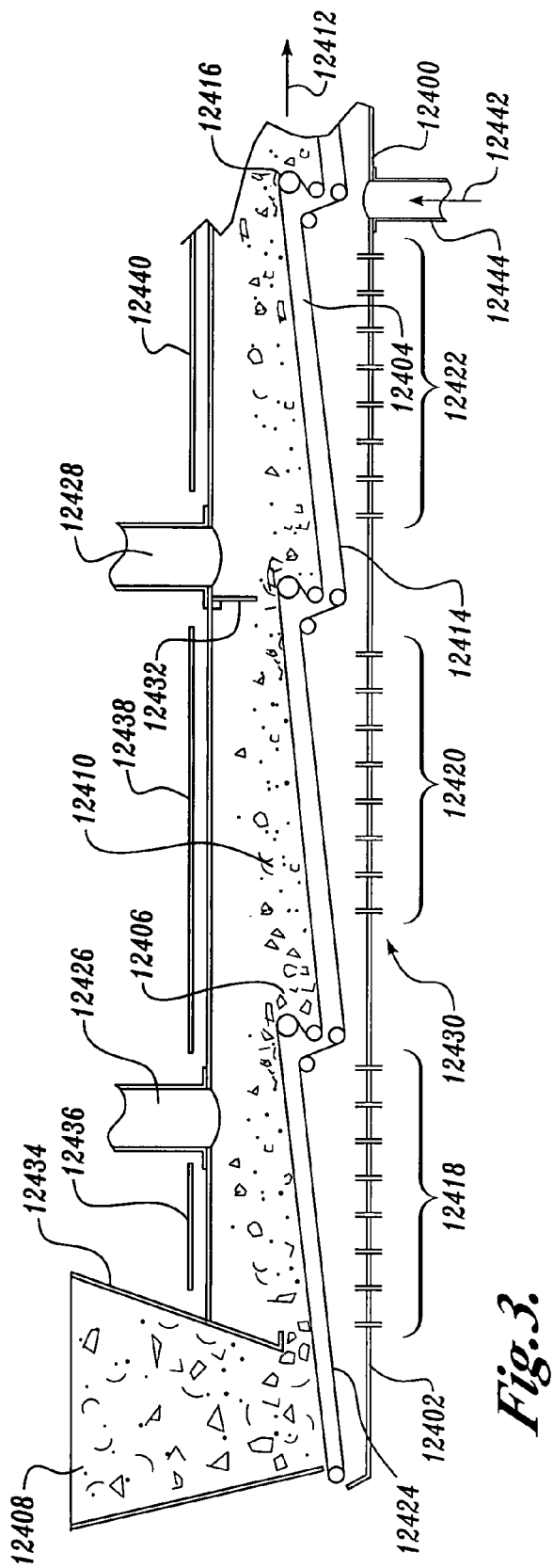
FIG. 3 shows a cross section illustration of a decontamination apparatus according to the present invention.

Referring now to FIG. 3 a side, cross sectional view of an apparatus arranged to treat boneless portions of meat is shown. A horizontally disposed conduit 12400 and 12402, that may be fabricated from any suitable metallic or plastics material which may also be transparent, is arranged with a product conveying apparatus 12404, mounted therein. In one embodiment, conveyor 12404 includes three conveyor runs. Each conveyor run rises in the direction of travel, so the end of a proceeding conveyor run is slightly at a lower position from the preceding one. Conveyor runs are thus connected with short sharp downward legs so as to provide "waterfalls" as shown at 12406. Waterfalls are created by providing a roller that overhangs into a proceeding conveyor run and a roller that is behind the overhanging roller, so as to resemble a backward "S" path traveled by conveyor. Product conveying apparatus 12404 is arranged to carry product 12408 and 12410 in the general direction shown by arrow 12412. A conveyor belt 12414 manufactured from any suitable conveyor belt material such as stainless steel wire mesh, is driven by a suitable electric motor over a plurality of rollers 12416. Gas injection ports 12418 are provided in groups 12418, 12420 and 12422 in the lower section of conduit 12400 through which any selected gas such as ozone, chlorine or carbon dioxide can be injected into spaces 12424 and in such a manner so that selected gases will reticulate upward through wire mesh conveyor belting and so as to contact all exposed surfaces of product 12410. Exhaust ducts 12426 and 12428 are located on the upper side of conduit 12400. It should be noted that the injection nozzles 12430 and exhaust ducts 12428 and 12426, could be located at any convenient position around the circumference of conduit 12400. Walls, such as 12432, can be provided on the upper interior surface of the conduit 12400 dividing gas injection groups. In this manner, gas is restricted from traveling thereto. However, interior walls 12400 are optional. A hopper 12434 is located at the entry end of conduit 12400 and product 12408 is suitably provided therein. A wall can be provided between conduit 12400 and hopper 12434 to restrict gas passage therethrough. UVC light sources are provided at 12436, 12438 and 12440 and in such a manner so that UVC light generated at said sources can pass through transparent conduit 12400 and directly contact the exposed surfaces of product 12410 as it is transferred along conveyor 12414. As product is transferred along conveyor 12414, it is exposed to gases (or liquids such as a solution of acidified sodium chlorite) provided through injection ports 12430 and UVC light. Gases, such as ozone and chlorine, introduced through injection port groups 12418 and 12420 can be extracted through exhaust port 12426 and are substantially restricted from passing through wall 12432, and likewise, gases injected through ports in group 12422 are also substantially restricted from passing through wall 12432. In this way, any gases injected through port groups 12418 and 12420 that do in fact pass by wall 12432 can be "washed" out through exhaust duct 12428 by any suitable gas such as carbon dioxide, injected through ports in group 12420. In this way product 12408 can be transferred through conduit 12400 from hopper 12434 and treated by exposure to various selected gases and UVC light and in such a manner so as to substantially, if not completely pasteurize the product by killing bacteria that may be present thereon. Conduit 12400 with conveyor 12414 therein mounted can be arranged with any suitable length and divided into any number of separated zones by such means as wall 12432. In this way, product 12408 can be sequentially exposed to any selected gases that can be then exchanged in a subsequent zone with another selected gas. A conduit 12442 may be provided in the wall of conduit 12428 and any suitable dry gas such as substantially dry $CO_2$ can be blown there through in such a way so as to contact the surfaces of product 12408 as it is transferred along conveyor 12414 and thereby assist in the evaporation and removal of excessive liquid such as water that may be present at the surface of the product. This is particularly helpful if bactericide liquids, such as a solution of acidified sodium chlorite (SANOVA), has earlier been sprayed onto the product. It should be noted that a screw conveyor can be used as an alternative to belt conveyor 12414.

Figure 4:
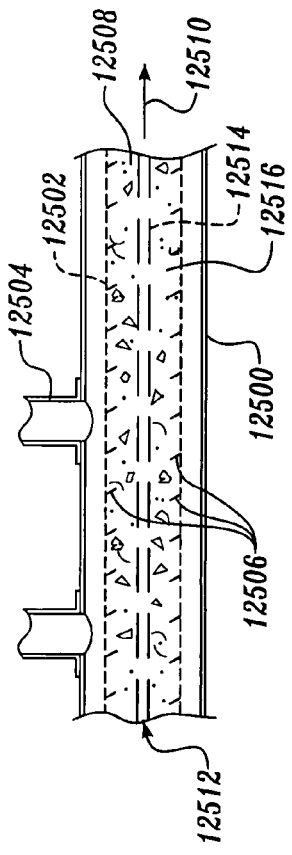
FIG. 4 shows a cross section illustration of a decontamination apparatus according to the present invention.

Referring now to FIG. 4 another embodiment for decontaminating beef according to the present invention is illustrated. A horizontally disposed conduit 12500 is arranged with a rotating wire mesh tube 12502 mounted therein. Conduit 12500 includes exhaust conduits 12504 mounted at any location about the circumference of the conduit 12500. Tube 12502 is arranged with spiraling blades 12506 attached about the inner surface of tube 12502 and in such a manner so that product 12508 is transferred in a direction indicated by arrow 12510 when tube 12502 is rotated in a constant direction and at a constant speed. I one aspect, the blades 12506 can be inclined in a direction to transfer the product in the direction of arrow 12510. A tube 12512 with ports 12514 therein is provided at the center of wire mesh tube 12502. Any selected gases can be injected through tube 12512 and through ports 12514 into tube 12502 and thereby into conduit 12500 so that direct gas contact with the exposed surfaces of product 12516 will occur. Gases can be vented through exhaust vents 12504 as required.

In this manner, the product 12508 is provided with selected gaseous, liquid or powdered substances in such a way so as to enhance the keeping qualities and quality of the boneless portions of meat.

In yet another aspect of the present invention, an apparatus is disclosed that will provide for an optimum duration of ozone exposure to perishable products, such as meat. Thus, the present invention provides for protection against the over exposure to ozone which may cause undesirable results in the final product. Contrary to conventional thinking, the present invention also minimizes the amount of liquid added in the product that reacts with ozone.

Figure 5:
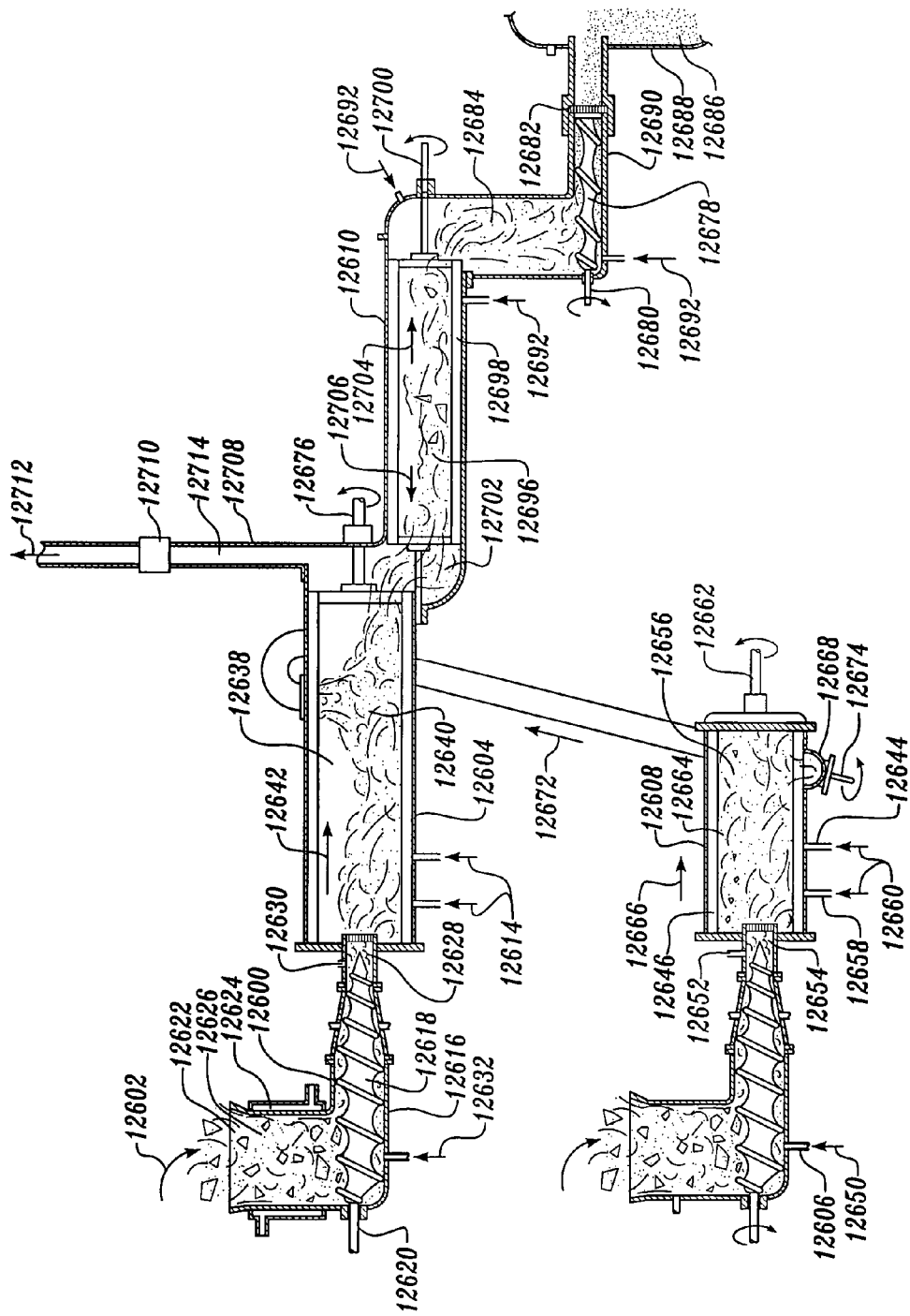
FIG. 5 shows a cross section illustration of a decontamination apparatus according to the present invention.

Referring now to FIG. 5, a system for maintaining the proper duration of ozone gas or ozone aqueous solution contact and or hydrogen peroxide ($H_2O_2$) with meat is schematically illustrated. Suitably, the contact time can be from several seconds to several minutes, with a suitable amount being from about 10 seconds to about 45 seconds, and sometimes from about 15 seconds to 30 seconds. The ozone treatment system includes at least a first propulsion station 12600 capable of transferring product from a receiving container, indicated by reference numeral 12602 forward to an ozone contact station 12604. The perishable product is suitably cut into sizable chunks coming from a portioning station (not shown). The chunks may be any suitable size. Suitably, the product can even come in different sizes so that parallel propulsion stations 12600 and 12606 and ozone contact stations 12604 and 12608 are provided, one for the relatively larger chunks and one for the relatively smaller chunks. In this manner the smaller chunks of perishable product can be contacted with ozone for a longer duration period. Suitably, this second contact period can be longer than 30 seconds. This is because the increased surface area of the smaller chunks of product can bear and carry therewith larger quantities of bacteria such as E-coli 0157:H7. The product can then be transferred to the first contact station to finish treatment and continue with gas scrubbing. The ozone contact station 12604 is suitably attached to the propulsion station 12600 in a substantially gas tight manner. The ozone treatment system further includes an ozone scrubbing station 12610, located downstream from the ozone contact station 12604, to substantially cleanse the ozone, and/or hydrogen peroxide, and/ or any oxygen gas that may be present having been derived from the decomposition of the ozone, from further or extended contact with the product. A venting station 12612 is located at a junction of the ozone contact station 12604 and the ozone scrubbing station 12610. While reference is made to a vessel having one vent. However, more than one vent can be provided in an ozone contact station, the description and the figure being an example of one embodiment. The ozone contact station 12604 and the ozone scrubbing station 12610 are likewise connected to one another in a substantially gas tight manner at the venting station 12612. However, in other embodiments, the need for one or more venting stations, similar in operation to venting station 12612, are provided along that upper length of ozone contact stations 12604 and/ or ozone contact station 12608. In this manner, any excess ozone or additionally added gasses can be vented more effectively. The ozone contact station 12604 includes an ozone injection point 12614, for ozone or any desirable bactericidal gas or mixture of gases or other suitable substances, injection point 12614 may also be used to inject a suitable quantity of water such as 1.5%, while the ozone scrubbing station 12610 includes a scrub gas injection point, for a gas without any free oxygen, such as carbon dioxide or nitrogen or mixture of such gas and any other gas. The ozone gas can combine with the water to form an aqueous ozone solution or hydrogen peroxide and thereby enhance the contact of the ozone with the relatively inaccessible surfaces of the meat portions. The ozone gas flows in the direction towards the venting station 12612, while the scrub gas likewise flows in the direction of the venting station 12612. The venting station 12612 can include a pressure regulating station that controls the pressure of the ozone contact chamber within a suitable range that inhibits the decomposition of the ozone. The ozone contact station 12604 can include a mixer to enhance the contact of ozone with the perishable product. The mixer may likewise perform as a transferring conveyor to move the product forward through the ozone contact station 12604. Likewise, the ozone scrubbing station 12610 may include a mixer to expose areas of trapped ozone gas to the scrubbing gas to expel the ozone from the product. The ozone scrubbing station 12610 can also include a transferring conveyor to carry the product forward. Once the product has been treated and scrubbed of ozone, processing according to other aspects of the present invention may proceed such as grinding or blending in a controlled atmosphere. Other embodiments of the scrubbing station 12610 can include a source of ultraviolet C radiation to further cause decomposition of the oxidizing gas, ozone. In this way, the ozone gas is displaced by the scrubbing gas, such as carbon dioxide.

In a further aspect of the present invention, the ozone contact stations 12604, 12608 and/or the scrubbing station 12610, can be provided with one or more nozzles (not shown)

for the introduction of one or more substances. It is known that ozone is a strong oxidizing agent. Therefore, in an effort to minimize or substantially reduce any deleterious oxidizing effect that the ozone may have on the beef product, an antioxidant, such as an organic acid, including the salts and esters of the organic acids, such as citric, acetic, ascorbic, and proprionic acid can be introduced before, after, sequentially or concurrently with the introduction of ozone, nitrogen, and/or carbon dioxide. Other agents, such as ammonia and hydrogen peroxide, or any combination of the all the above can be provided. In one instance, ozone can be introduced into one of the aforementioned ozone contact stations, followed by an antioxidant, which is thereafter followed by purging with nitrogen and/or carbon dioxide gas. In this manner, any oxidizing effect imparted by ozone is significantly reduced.

In an aspect of the present invention, a substantially enclosed system still allows the escape of gases and vapors. However, solids loss is kept at a minimum, unlike the conventional systems which allow blood or other fluids to escape with the water and/or wash.

A further aspect of the present invention is realized by including in the aforementioned system the capability to add moisture in the form of water to the system where the amount of water is calculated based on the amount of gas added. This is advantageous from the standpoint of conserving the yield. For instance, in one aspect, the gas, such as carbon dioxide is injected into the system as a gas (or in some instances as a solidified form or as a liquid form). The process of injecting liquid carbon dioxide then causes an amount of moisture to be driven away as water vapor or ice crystals. The amount of water vapor that is driven away can be readily calculated by the amount of carbon dioxide which is injected and perhaps also knowing the form of the carbon dioxide. In turn, the amount of carbon dioxide that is injected is based on the temperature of the product. Thus, by measuring the amount of carbon dioxide that is injected, a quantity of water can be calculated to compensate for the moisture that is calculated to be driven away. The amount of water that is lost as water vapor and is being replenished may also be calculated from the temperature of the product in some instances. Under some circumstances, the amount of moisture that is lost can be as high as 1% or sometimes even higher. The method and apparatus of providing capability to add water based on the amount of gas realizes a substantial cost savings, since the moisture is considered to have value in the final product which is eventually packaged. Any suitable port can be provided on any vessel to inject an amount of water based on the amount of carbon dioxide. Alternatively, the water can be injected along with any line or stream being transferred into the vessel.

In other aspects of the invention, moisture losses occur through the normal tendency of water to evaporate into the ambient atmosphere. The loss of water occasioned by evaporation can be compensated for by including a calculated amount of water to make up for the water lost through evaporation. Such calculated measurements can consider the time and temperature exposure of the products through the several processing stages. In still further aspects, the amount of water can be determined by weighing the product before and after any processing stage and realizing any weight loss is due to evaporation or other form of moisture loss. The amount of water can then be added that is approximately equivalent to the difference in weight. In yet another aspect, the product may undergo freezing or exposure to temperatures below the freezing point of water at the particular pressure. The time and temperature exposure of the product to these conditions further causes loss of moisture from the product, thus reducing yield. In one aspect of the invention, an amount of moisture in the form of water can be added to compensate for the amount of water that is lost at any freezing stage of the product processing. In one instance, the amount that is lost to freezing can be calculated by measuring the time of exposure of the product to the freezing temperature and also by measuring the temperature. Thus, a calculated amount of water can be added to the product to compensate for any moisture loss during any freezing stage of processing, such as occurs in a freezing tunnel or during tempering.

In a further aspect of the present invention, the amount of water with agent, wherein the agent may be selected from ozone or SANOVA, can be determined based on the how the beef portions or any other perishable product, such as ground beef will be subsequently processed. For example, in one instance, chubbs or ground beef portions will have about 2.5% water added to or with agent, which may comprise about 1.5% pickup (as allowed by the USDA) and about 1% evaporation. However, in other aspects, if frozen patties are being treated, then about 3.5% to about 4% water would be added to or with agent comprising about 1.5% pick-up and about 2% to about 2.5% evaporation. In this manner, depending on how the product will later be processed determines the amount of water that will be added. This is possible because the amount of water that is added can be predicted based on observation. The amount of water that is added can further be calculated based on the downstream processing steps.

In yet another aspect of the present invention, the amounts of water are proportional to the total grinds volumetric or mass flow through the enclosed system, which can be added according to the product and or the evaporation rate. The present invention can provide for a separate decontamination system per stream.

Referring again to FIG. 5, a cross-sectional side elevation of an apparatus assembled so as to sanitize boneless meat in an enclosed environment comprising a series of pressure vessels joined together in a substantially gas tight manner is schematically illustrated. A boneless meat compressing and dispensing assembly 12616 is arranged with a horizontally disposed screw 12618 driven by the shaft 12620, mounted in the lower section of vessel 12600. An opening 12622 allows boneless beef to be loaded into vessel 12600 in the direction shown by arrow 12602. Vessel 12600 may be temperature controlled by any suitable means such as by heat exchanging via a suitable medium passed through jacket 12624. Portions of meat 12626 are loaded into vessel 12600 and are then transferred after being compressed through an aperture 12628 and into pressure vessel 12604. Pressure vessel 12604 is suitably constructed as a horizontally disposed cylindrical vessel. Suitably, the pressure within pressure vessel is controlled at any pressure above atmospheric to about 40-50 psig, as ozone can decompose at higher pressure levels. The rate at which meat is continuously transferred through aperture 12628 is controlled at a selected rate and a quantity of water can be continuously provided through any port such as 12630. The quantity of processing aid water and boneless beef can be controlled such that the respective quantities transferred into pressure vessel 12604 are maintained at selected proportions, such as 98.5% meat and 1.5% water. While by regulation, the amount of water that is present in the meat product is controlled at a suitable percentage, the present invention is not thereby limited. The present invention may suitably carry out the desired sanitizing of the meat with any amount of water, though at the present time, the amount of water is about 1.5% of the total meat product.

In this way a precise quantity of water, substantially equal to about 1.5% of the finished ground meat, by weight, can be added and retained in accordance with USDA allowances. It should be understood that any amount other than 1.5% can be added, the particular amount presently being dictated by government regulations. Conventional methods that do not measure the quantity of water that is then added to the ground meat must allow excess water to run off without control and therefore, with other methods, a precise amount of 1.5% cannot be consistently retained, with the grinds, after processing.

The limited amount of water that is added during the practice of the present invention is also contrary to conventional processing which typically can, with the use of the Alcide Sanova process for example, wash the meat product in large quantities of water and then remove the excess water, thereby expending additional energy and needlessly washing away valuable protein from the product. During the transfer of meat pieces into pressure vessel 12604 air or gas is substantially excluded by the action of horizontally disposed screw 12618. A gas such as carbon dioxide can be provided into port 12632 to assist in displacing air from vessel 12600. Pressure vessel 12604 is fitted with an impeller 12634 with longitudinally disposed blades having parallel external and internal edges, whereby the external edges are in close proximity to the inner surface of pressure vessel 12604 that is provided with round cross sectional profile. One of the ends of a blade is radially displaced from the corresponding end, so that the blades, while turning, create a lifting and forward motion as the impeller is turned inside of the pressure vessel 12604. Impeller 12634 is mounted to bearings that allow rotation about a horizontal axis driven via shaft 12636 by a driving means (not shown) with variable speed adjustment. Impeller 12634 is arranged with a central space 12638 and having a profile that transfers meat portions 12640 there through in the direction of arrow 12642 when rotated. In this way, impeller 12634 agitates the beef to more fully expose the beef to the ozone. It is also contemplated that vibration of the beef in any manner may realize benefits when used in the invention. An ozone generator (not shown) is arranged to generate ozone gas from either atmospheric air or a source of oxygen and under a pressure of approximately 45 psi transfer such ozone gas which can be transferred with measured quantities of processing aid water through ports 12614 and into space 12638 where said ozone gas pressure is held at approximately 45 psi and allowed to contact the surfaces of meat pieces 12640. The rotating action of impeller 12634 elevates meat pieces upwardly and tumbles the meat pieces thereby ensuring that substantially all surfaces of meat pieces contact the ozone gas therein. Meat pieces transferred through aperture 12628 are suitably compressed such that gas cannot escape there through. Ozone gas and/or any other selected gas transferred into space 12638 through ports 12614 is continuously replenished as it is allowed to flow in the direction shown by arrow 12644 toward venting conduit 12612. In this way the residence time of meat portions 12640 in space 12638 can be limited to a specified period of time which is controlled by the rate of transfer through vessel 12604 by impeller 12634. During that transfer the residence time can be arranged to ensure that all surfaces of meat pieces are exposed to said ozone gas and mixed thoroughly with water injected through port 12630. Another meat transfer apparatus 12606 can be arranged to transfer a separate stream of meat pieces into pressure vessel 12606 with impeller 12646 mounted therein. Meat pieces are loaded into vessel 12606 in the direction shown by arrow 12648. A selected gas, with processing water can be provided through port 12650 and/or processing aid water injected through port 12652 as required and in quantities that are approximately 1.5% of the volume of meat transferred into vessel 12608 through aperture 12654 where said meat can be combined with water and compressed so as to exclude any gas or air transferring there through and preventing the escape of any gas from space 12656. Ozone gas is provided at a selected pressure through ports 12658 and 12644 in the direction shown by arrows 12660. A horizontally disposed impeller with blades 12646 is mounted so as to rotate about a horizontally disposed axis and is driven by a variable speed drive attached to shaft 12662. The residence time of meat pieces 12664 is determined by the rate of rotation of impeller 12646 and is transferred through vessel 12608 in the direction shown by arrow 12666 and into depression 12668. Meat pieces are transferred from depression 12668 through conduit 12670 in the direction shown by arrow 12672 and into vessel 12604 at a selected rate of transfer controlled by an elevating screw housed with conduit 12670 and driven by a variable speed drive attached to shaft 12674. In this way two streams of meat pieces are treated with ozone gas and are then subsequently combined together. Meat pieces provided in streams shown by arrow 12602 may be substantially larger than pieces provided in stream shown by arrow 12648. It should be noted that it is typical for the amount of bacteria such as *E. coli* 0157:H7 to have greater concentration on the surfaces of smaller pieces of meat than is typically present on the surface of larger pieces of meat. The process described herein can provide for smaller pieces of meat processed through vessel 12608 to be exposed to ozone gas for a longer period of time and as may be required than those larger pieces of meat that are processed through vessel 12604. Both streams of meat are combined in vessel 12604 and transferred there together in the direction shown by arrow 12642. Referring now to vessel 12676 a meat grinder is located in the lower section thereof with a horizontally disposed auger 12678 rotated by variable speed drive (not shown) attached to shaft 12680 with blade and grinding plate located at 12682. The meat grinding assembly can grind meat pieces 12684 and transfer grinds 12686 directly into vessel 12688, and thereafter the meat can be treated, processed or packaged according to any one aspect of the present invention. Meat transferred there through is compressed in such a manner that gas cannot escape through grinding plate 12682 and said compressed meat thereby provides a plug even though it is being continuously transferred into vessel 12688. Pressure vessel 12610 is attached at one end to grinder vessel 12690 and at the other end to vessel 12604 and in such a way that boneless meat is transferred from vessel 12604 and into horizontally disposed vessel 12610 that can be located in a lower position to vessel 12604 so as to facilitate transfer of boneless meat. Carbon dioxide gas is provided through ports 12692 at a pressure equal to the ozone gas provided through ports 12660 and 12614. The $CO_2$ gas is provided so as to fill space 12694 and 12696. A horizontally disposed impeller with blades 12698 is mounted in vessel 12610 and is rotated by shaft 12700 in such a manner that meat pieces 12702 are transferred through vessel 12610 in the direction shown by arrow 12704 however, gas injected through ports 12692 will flow in the direction of lower pressure shown by arrow 12706 and in doing so can substantially remove ozone gas that has been in contact with said meat pieces during the transfer of said meat pieces through vessel 12604. A vertically disposed conduit 12708 is arranged with pressure regulator valve 12710 in such a manner that will allow gas to pass along conduit 12708 in the direction shown by arrow 12712. In this way gas pressure at 12714 can be regulated to a desired pressure while still allowing the regulated escape of exhaust gases therethrough. The purpose of arranging apparatus shown in FIG. 5 is to provide a means of sanitizing meat pieces by exposure to ozone gas without allowing extended exposure. Ozone gas has a tendency to decompose into oxygen gas but is more effective in sanitizing when held at a pressure of approximately 40 psi. Extended exposure of red meat to ozone gas will result in the formation of metmyoglobin discoloration at the surface of the meat but when ozone gas is used in the manner herein described, the exposure time is limited to an extent that will minimize the extent of metmyoglobin formation.

Figure 6:
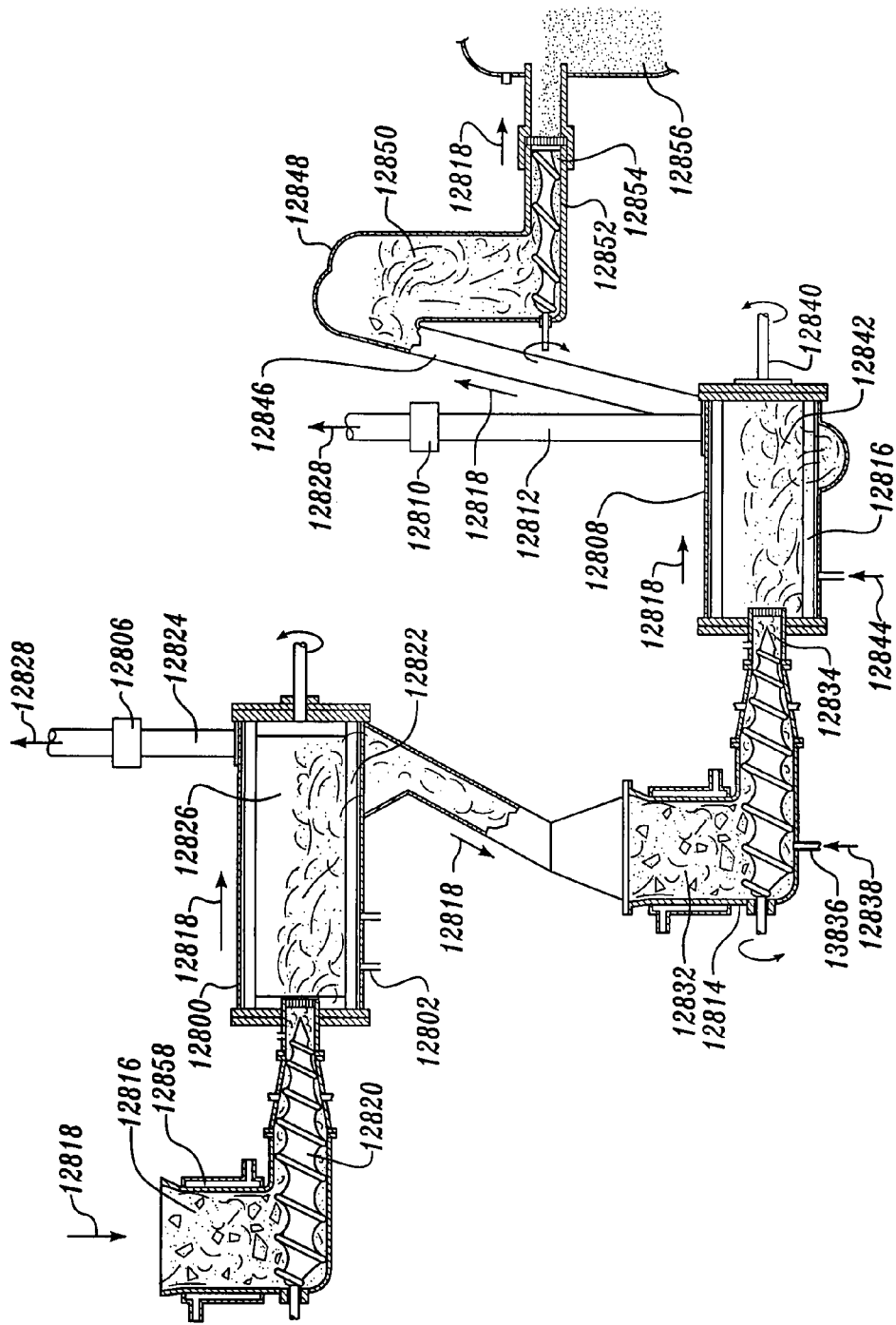
FIG. 6 shows a cross section illustration of a decontamination apparatus according to the present invention.

Referring now to FIG. 6, a further embodiment of a second ozone treatment system is schematically illustrated. The system includes a first ozone contact station 12800, having an ozone injection point 12802. The contact time can be provided to be within several seconds to several minutes. As with the embodiment mentioned above, the contact time can be about 15 seconds to about 30 seconds. However, the contact time can be easily adjusted to be more that 30 seconds depending on the size of the perishable good chunks. The ozone contact station 12800 includes a venting station 12804 with a lower stage pressure regulating station 12806 that suitably maintains the pressure in the ozone contacting station 12800 within a prescribed acceptable limit so as not to cause excessive amounts of decomposition of the ozone. Suitably the pressure within the ozone contact station 12800 can be from slightly above atmospheric pressure to about 50 psig. The venting station 12804 can suitably be connected to an end of the ozone contacting station 12800. The ozone contact station 12800 has a transfer device to move the perishable product from the entrance to the exit, thus allowing exposure of the perishable product to the ozone. The transfer device can suitably be controlled to time the average amount of exposure the perishable good is in contact with the ozone. The ozone treatment system also includes an ozone decomposition station 12808, suitably located downstream of the ozone contact station 12800. Suitably, the ozone is eliminated from the perishable product by destruction of the ozone into oxygen which is then scrubbed free from the perishable product by any suitable scrub gas, such as carbon dioxide or nitrogen, or scrubbing gas mixture with any other gas. The ozone decomposition station 12808 suitably operates on the principle of ozone destruction by increased pressure, therefore, the ozone treatment system also includes an upper stage pressure regulating station 12810 connected to a second venting station 12812, suitably located on an end of the ozone destruction station 12808. The ozone destruction station 12808 is maintained at a relatively higher pressure than the lower stage pressure regulating station and may also be provided with a suitable source of suitable UV light, such as UVC, therein which can also assist in destruction of the ozone and or bacteria that may be present with the meat. Any device that can provide a pressure in the ozone destruction range will serve as the ozone destruction station in the practice of the invention. In this instance, the resultant oxygen can be scrubbed or washed out by any suitable gas, such as carbon dioxide. In another aspect, the pump can be connected to a suitable vacuum pump to remove the oxygen therefrom However, in other instances, the ozone destruction station includes an upper stage pressure regulating station 12810 can suitably be located downstream of the ozone destruction station 12808 to thereby control the pressure of ozone destruction station 12808. Suitably, a propulsion station 12814 is interposed between the lower pressure ozone contact station 12804 and the higher pressure ozone destruction station 12808 to transfer the perishable good from the ozone contact station 12800 to the ozone destruction and gas scrubbing station 12808. Once the perishable product is cleansed of ozone (or substantially cleansed of ozone), the product is free to be processed and or packaged according to any other aspect of the present invention.

A specific embodiment of an ozone treatment system for perishable products having an ozone contact station with a low pressure regulating station and an ozone destruction and gas scrubbing station having a high pressure regulation station will now be described with reference to meat.

Referring again to FIG. 6, a further embodiment of an ozone treatment apparatus is schematically illustrated. A stream of boneless meat 12816 is provided in the direction shown by arrow 12818 and transferred after compression by auger 12820 into vessel 12800. Vessel 12800 is arranged with horizontally disposed impeller 12822 and supply of ozone gas through ports 12802. Exhaust conduit 12824 is attached to vessel 12800 and a pressure regulating valve 12806 controls pressure of ozone gas in space 12826 at a higher pressure than what is vented at stream 12828. However, in other alternates, it is possible to equip the vessel 12800 with one or more exhaust conduits, similar to the exhaust conduit 12824. These additional conduits (not shown) can be located along the length of the upper vessel wall 12800. Boneless meat pieces are transferred in direction shown by arrow 12818 and into vessel 12814. Auger 12830 transfers boneless meat 12829 through aperture 12835 into vessel 12832. $CO_2$ gas can be provided through port 12836 in the direction shown by arrow 12838. Pressure vessel 12808 is fitted with impeller 12816 which is driven by variable speed drive attached to shaft 12840. Space 12842 is pressurized with a selected gas such as carbon dioxide provided through port and in direction shown by arrow 12844. Exhaust conduit 12812 is fitted with pressure regulator valve 12810 that maintains gas pressure at 12842 at a selected pressure. However, in other alternates of the present invention, it is possible to include one or more exhaust conduits (not shown), similar in operation to exhaust conduit 12812. These additional conduits (not shown) can be located along the length of the upper vessel wall 12808. Meat pieces are transferred through conduit 12846 into vessel 12848 in direction shown by arrow 12818. Meat pieces 12850 are then transferred by auger 12852 through grinding head 12854 and directly into vessel 12856. In this way boneless meat can be processed prior to grinding when the surface area of said boneless meat is less than after grinding. Meat can be treated in vessel 12800 in a continuous process and exposed to ozone gas at the elevated pressure of approximately 44 psi. Meat can then be transferred via transferring vessel 12811 into vessel 12832. Gas pressure in vessel 12832 can be set at a different pressure to that in vessel 12800. For example the gas pressure at 12828 may be 44 psi which is a most suitable pressure for ozone gas when used for sanitizing, however gas pressure at 12850 can be maintained at a substantially higher pressure of for example 80 psi and at which pressure ozone gas will more readily decompose. In this way ozone gas can be used as a sanitizer at the most suitable pressure of 45 psi (and controlled temperature) and the spent ozone gas can be exhausted through conduit 12824. Ozone gas is substantially prevented from entering vessel 120808, however any ozone gas that is transferred into vessel 12808 can be exposed to a higher pressure which will cause it to decompose which can then be exhausted through conduit 12812 more readily and sanitized meat can be transferred for subsequent grinding into vessel 12848 or to any other aspect of processing or packaging meat described herein.

In a further aspect of the present invention, anyone of the vessels 12858, 12800, 12814, 12808 and 12848 and their interconnecting conduits, can be provided with one or more nozzles (not shown) for the introduction of one or more substances. It is known that ozone is a strong oxidizing agent. Therefore, in an effort to minimize or substantially reduce any deleterious oxidizing effect that the ozone may have on the beef product, an antioxidant, such as an organic acid, including the salts and esters of the organic acids, such as citric, acetic, ascorbic, and proprionic acid can be introduced before, after, or concurrently with the introduction of ozone, nitrogen, and carbon dioxide. In one instance, the anti-oxidant agent can be introduced with an amount of water. In one instance, ozone can be introduced into one of the aforementioned vessels, followed by an antioxidant, which is thereafter followed by purging with nitrogen and/or carbon dioxide gas. However, in other aspects, the ozone may be introduced and purged, and thereafter the anti-oxidant is introduced. In this manner, any oxidizing effect imparted by ozone is significantly reduced.

In yet another aspect of the present invention, in the decontamination process disclosed in association with FIGS. 5 and 6, there are two components of added water. One component is a USDA allowable "pick-up" of about 1.5% when water is used as a "processing aid" in the decontamination process. This is a valuable addition because the added water can be included in the overall product yield, however, all other methods do not measure the amount of water that is added and dump large quantities of water and then simply allow excess water to drip off. Since, per USDA standards, the 1.5% cannot be exceeded, it is impossible according to conventional methods to determine when sufficient water has been allowed to drip off to arrive at 1.5%. According to the invention, the amount of water is measured to arrive at substantially 1.5%, thus eliminating the need to "drip off" any excess water.

The second component of added water is the amount of water associated with compensation for loss due to evaporation and freezer loss, which occurs because of sublimation of ice crystals during freezer storage. In some instance, the amount can be as high as 1.25% or even higher. According to the present invention, the amount of loss caused by evaporation or sublimation can be calculated via a computer and the amount that is predicted to be lost can be added in advance to the enclosed conduit and ground with the meat. There are numerous variables to consider when calculating the second component of water. In the grinding process, the surface area of the grinds is increased by a huge factor, which in some instances can perhaps exceed several hundred fold. Because of the increased surface area, the additional water can then become evenly distributed over the increase surface area. It is important to realize that the amount of processing aid water added cannot exceed the loss, (other than the amount allowed by present law of 1.5%). Providing for better control of processing aid water within the acceptable limits is an advantage of the present invention over previous methods.

Figure 7:
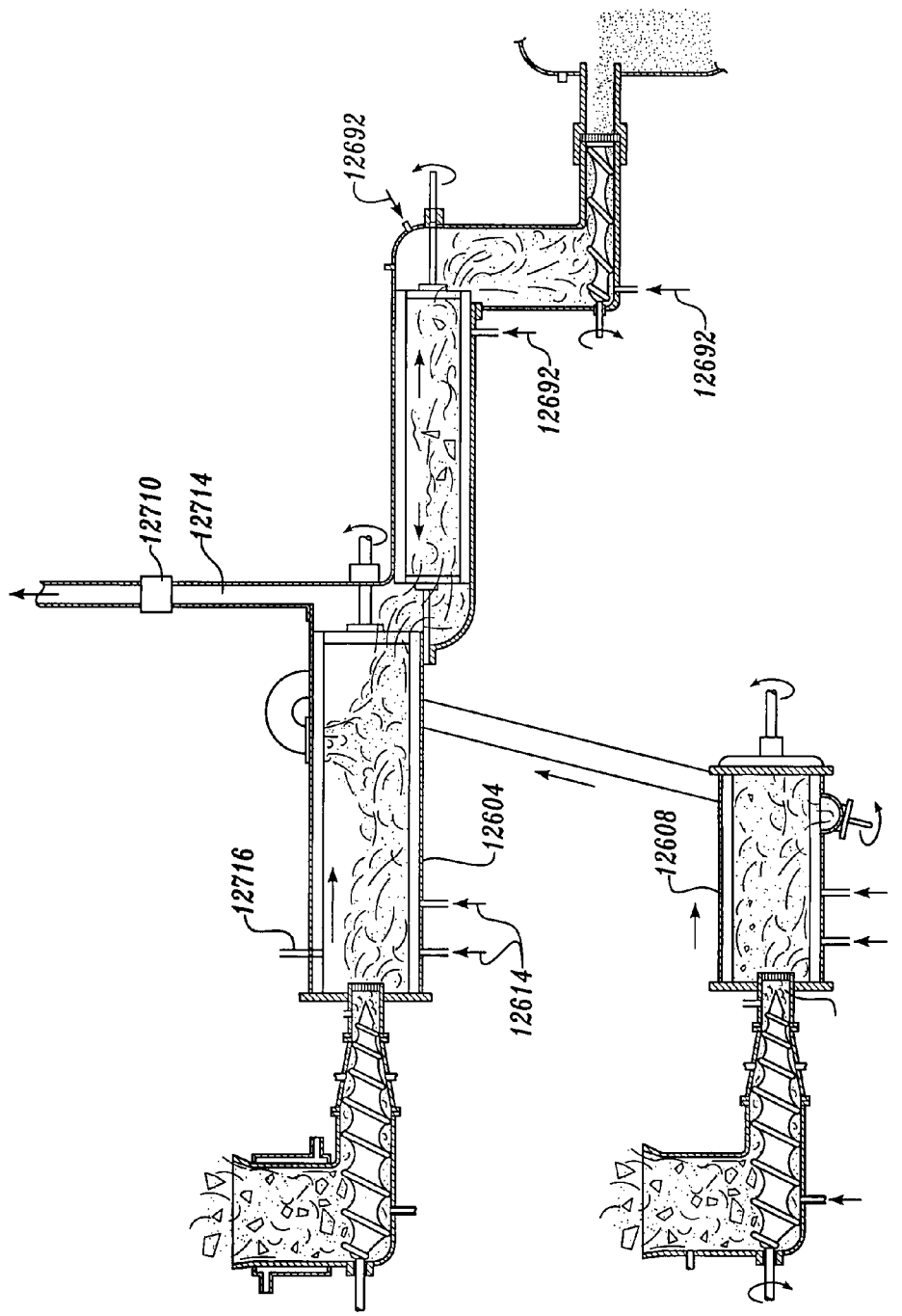
FIG. 7 shows a cross section illustration of a decontamination apparatus according to the present invention.

Referring to FIG. 7, a further embodiment of the present invention is shown. FIG. 7 is similar to FIG. 5, however, one or more injection ports 12716, can be provided in vessel 12604 or vessel 12608 (ports 12716 not shown). Ports 12716 suitably can carry chlorine dioxide ($ClO_2$). In one instance, the port 12716 can be provided downstream of the ozone injection ports 706, but upstream of the carbon dioxide ports 12692. Furthermore, the ports 12716 can be provided on the upper or lower portion of the vessel 12604. According to the invention chlorine dioxide can be combined with ozone to provide a synergistic decontamination effect, than ozone or chlorine dioxide alone can provide. The reaction of the chlorine dioxide and the ozone advantageously consumes the chlorine dioxide, while providing the decontamination effect. In another aspect, a filter containing manganese dioxide can be provided in the vent exhaust outlet 12714, before or after the regulator valve 12710. In this aspect the manganese dioxide can eliminate any unreacted ozone that is expelled with the carbon dioxide.

Figure 8:
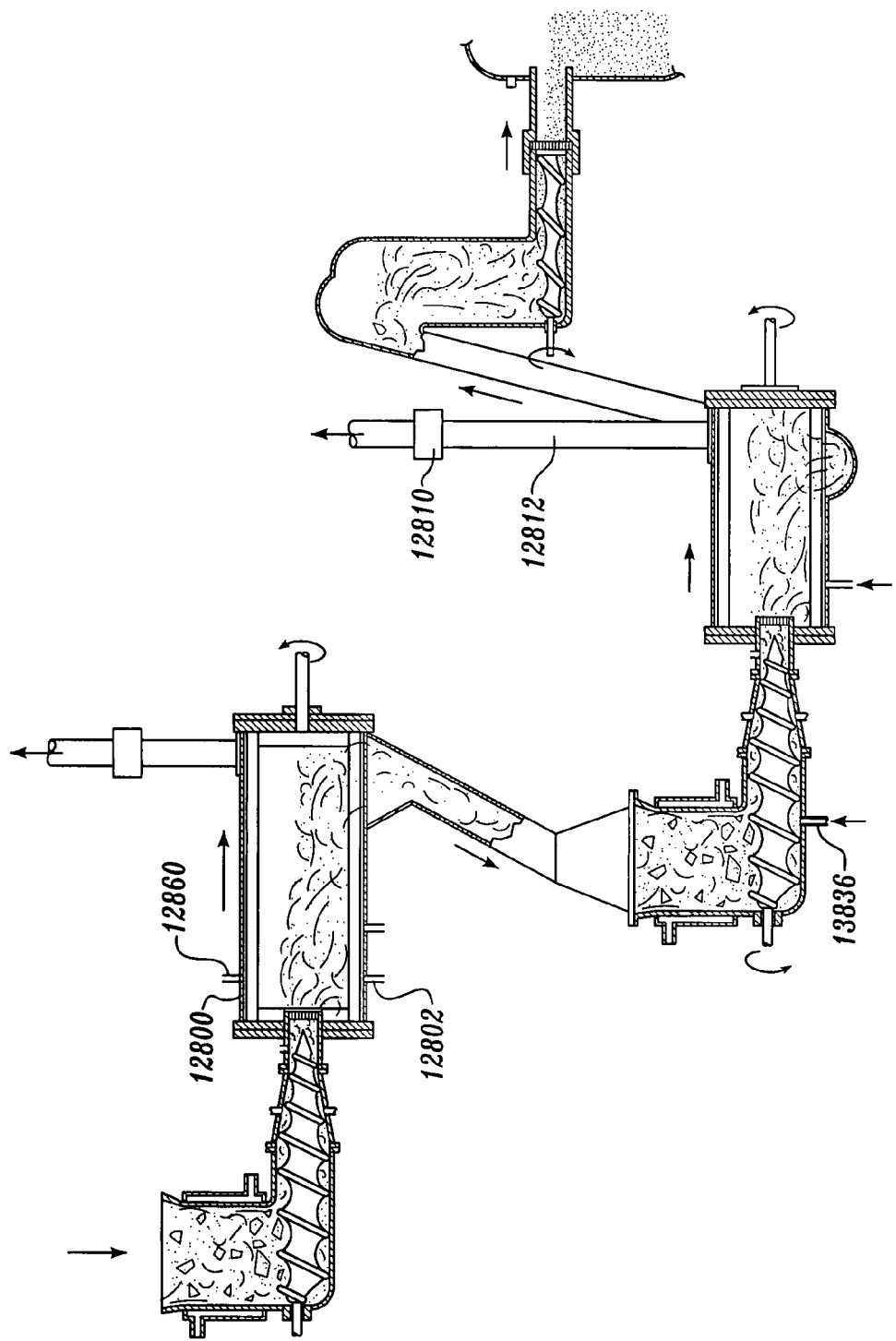
FIG. 8 shows a cross section illustration of a decontamination apparatus according to the present invention.

Referring to FIG. 8, a further embodiment of the present invention is shown. FIG. 8 is similar to FIG. 6, however, one or more injection ports 12860, can be provided in vessel 12800. Ports 12860 suitably can carry chlorine dioxide, $ClO_2$. In one instance, the port 12860 can be provided downstream of the ozone injection ports 12802, but upstream of the carbon dioxide ports 12836. Furthermore, the ports 12860 can be provided on the upper or lower portion of the vessel 12800. According to the invention chlorine dioxide can be combined with ozone to provide a synergistic decontamination effect, than ozone or chlorine dioxide alone can provide. The reaction of the chlorine dioxide and the ozone advantageously consumes the chlorine dioxide, while providing the decontamination effect. In another aspect, a filter containing manganese dioxide can be provided in the vent exhaust conduit 12812, before or after the regulator valve 12810. In this aspect the manganese dioxide can eliminate any unreacted ozone that is expelled with the carbon dioxide.

In one particular embodiment of the apparatus shown in FIGS. 5, 6, 7, and 8, any suitable refrigeration units may be interfaced with one or more of the vessels to provide a sequential and continual drop in temperature of the beef as it progresses from the pumping station to the ozone contact station, the scrubbing station, and finally the meat grinding station. In one instance, three temperature zones can be established. A first temperature zone, such as while the beef is transferred through the ozone contacting zone, can be in the range of about 30° to 36° F. In this first zone, the processing aid water does not freeze and crystallize prior to it performing the function of a processing aid. A second temperature zone, such as during the grinding, pre-blending, pumping and fat measuring process can be in the range from about 29° to about 38° F. A third temperature zone, such as during the continuous blending and subsequent storage prior to packaging or further use, can be in the range of about 27° to about 30° F. Any temperature zone can be provided in any of the aforementioned vessels, referring to FIG. 5, for example, pumps 12616 and 12606, ozone contact vessels 12604 and 12608, ozone scrubbing vessel 12610, meat grinder 12690, and storage vessel 12688. In one instance, temperature zone 1 can be reached in ozone contact station 12604. The second temperature zone can be reached in vessel 12610, and the third temperature zone can be reached in vessel 12690. Any temperature zone can be provided in any vessel. However, a preceding temperature zone is suitably at a higher, or warmer, temperature than the one following it. In this manner, the effect of ozone, chlorine dioxide, and any other agent added therein is effectively increased by the stepwise decreasing change in temperature.

While illustrative embodiments have been illustrated and described, it will be appreciated that various changes can be made therein without departing from the spirit and scope of the invention.

The embodiments of the invention in which an exclusive property or privilege is claimed are defined as follows:

1. A method for producing treated meat having a predetermined proportion of water in a container, comprising:
   in a computer, calculating water losses in meat during processing of the meat;
   placing meat in vessel;
   introducing carbon dioxide under pressure and an amount of water into the vessel to form carbonic acid having a pH below 5 on the surfaces of the meat;

agitating the meat in the vessel to expose surfaces of meat to carbonic acid:
wherein said amount of water is a calculated amount of water that is lost during processing to result in a predetermined proportion of water in the meat; and
packaging the meat containing a predetermined proportion of water in a container.

2. The method of claim 1, wherein the measured amount of water corresponds to an amount of water calculated that is lost during refrigeration and before treating with the carbon dioxide.

3. The method of claim 1, wherein an amount of water is calculated by measuring the duration of a processing step and the temperature of the meat at least at the processing step.

4. The method of claim 3, wherein the processing step is refrigeration.

5. The method of claim 1, wherein an amount of water further comprises water calculated that will be lost subsequent to treating the meat.

6. The method of claim 1, wherein the measured amount of water is calculated from the amount of carbon dioxide added.

7. The method of claim 1, wherein the measured amount of water is calculated from the temperature of the meat.

8. The method of claim 1, wherein the measured amount of water is calculated from the temperature of the meat and the time of the meat at the temperature.

9. The method of claim 1, wherein the measured amount of water is calculated by weighing the meat before and after a processing step before treating with the carbon dioxide.

10. The method of claim 1, wherein added water is ground with the meat.

11. The method of claim 1, further comprising excluding oxygen from the container.

12. A method for producing treated meat having a predetermined proportion of water in a container, comprising:
determining a proportion of water suitable for a packaged meat;
placing meat in a vessel;
introducing a bactericide and added water into the vessel, wherein the added water exceeds the predetermined proportion of water suitable for packaged meat;
calculating an amount of water that is evaporated by contacting the water with a controlled exposure to a gas;
introducing a controlled quantity of gas into the vessel thereby causing evaporation of water from the meat with the gas to produce treated meat having the predetermined proportion of water; and
packaging the treated meat containing a predetermined proportion of water suitable for packaged meat.

13. The method of claim 12, wherein the bactericide comprises acidified sodium chlorite.

14. The method of claim 12, wherein the meat is exposed to dry carbon dioxide gas.

15. The method of claim 12, wherein the bactericide comprises chlorine or a chlorine-containing compound.

16. The method of claim 12, wherein the bactericide comprises ozone.

17. A method for producing treated meat having a predetermined proportion of water in a container, comprising:
determining a proportion of water suitable for a packaged meat;
placing meat in a vessel;
introducing a bactericide and added water into the vessel, wherein the added water exceeds the predetermined proportion of water suitable for packaged meat;
calculating an amount of water that is evaporated by the introduction of a gas;
introducing carbon dioxide into the vessel thereby removing water in excess of the predetermined proportion of water in meat to produce treated meat having the predetermined proportion of water suitable for packaged meat; and
packaging the meat containing a predetermined amount of water.

18. A method of processing perishable products, comprising:
sealing a perishable product in an enclosure;
in a computer, calculating an amount of water that evaporates from the perishable product; and
introducing carbon dioxide and an amount of water into the enclosure, said amount of water calculated to be the amount of water that is lost through evaporation to result in a predetermined amount of water in the product when the product is packaged.

19. A method for producing treated meat having a predetermined proportion of water in a container, comprising:
placing meat into a vessel;
with a computer-controlled process, calculating water losses in meat during processing;
introducing into the vessel carbon dioxide and comprising a measured amount of water to provide a fluid capable of killing bacteria,
agitating the meat in the vessel to expose surfaces of meat to the carbon dioxide;
wherein said measured amount of water is a calculated amount of water equal to an amount of water which is a greater amount of water than the water lost during meat processing due to evaporation;
wherein an amount of water equal to at least the difference between the greater amount of water and the pre-determined proportion of water is removed providing treated meat having a pre-determined proportion of water; and
packaging the treated meat containing a predetermined proportion of water in a container.

* * * * *